US007830906B2

(12) United States Patent  (10) Patent No.: US 7,830,906 B2
Satoh et al. (45) Date of Patent: Nov. 9, 2010

(54) VARIABLE TIME DIVISION MULTIPLEX TRANSMISSION SYSTEM

(75) Inventors: Masahito Satoh, Yokohama (JP); Hitoshi Kondoh, Yokohama (JP); Shigetoshi Nakao, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 238 days.

(21) Appl. No.: 11/858,052

(22) Filed: Sep. 19, 2007

(65) Prior Publication Data

US 2008/0069151 A1 Mar. 20, 2008

Related U.S. Application Data

(63) Continuation of application No. 10/314,846, filed on Dec. 9, 2002, now abandoned.

(30) Foreign Application Priority Data

Dec. 28, 2001 (JP) ............................. 2001-400906

(51) Int. Cl.
*G06F 3/00* (2006.01)
(52) U.S. Cl. ........................................ 370/423; 710/10
(58) Field of Classification Search ................ 370/410, 370/468, 352, 423; 709/228; 710/9, 10, 710/4, 107, 110; 713/500
See application file for complete search history.

(56) References Cited

U.S. PATENT DOCUMENTS 4,829,445 A * 5/1989 Burney ......................... 700/230
5,204,669 A * 4/1993 Dorfe et al. ............ 340/825.52
5,329,431 A * 7/1994 Taylor et al. ................... 362/85

5,404,460 A * 4/1995 Thomsen et al. ............... 710/9

(Continued)

FOREIGN PATENT DOCUMENTS

EP 0822680 2/1998

(Continued)

OTHER PUBLICATIONS

Simple Fairness Protocols for Daisy Chain Interconnects; Olesinski, W.; Eberle, H.; Gura, N.; Dickson, B.; Silverton, A.; Jairath, S.; Yakutis, P.; High Performance Interconnects, 2009. HOTI 2009. 17th IEEE Symposium on Aug. 25-27, 2009 pp. 22-30.*

(Continued)

*Primary Examiner*—Salman Ahmed
(74) *Attorney, Agent, or Firm*—John J. Patti; Wade J. Brady, III; Frederick J. Telecky, Jr.

(57) ABSTRACT

A time division multiplex transmission system transmits information on multiple channels by using a transmission path with variable time division multiplexing. The variable time division multiplex transmission system of this invention is equipped with multiple channel devices 30 and a single transmission path 5 connected to these multiple channel devices. The multiple channel devices 30 transmit or receive data over the transmission path. Additionally, the system is equipped with a circuit that determines consecutive time slots for using the transmission path, and each of the channel devices transmits or receives data using consecutive time slots. Data can be transmitted in two or more different transmission bands, and the different transmission bands are realized by making the number of time slots used for a communication frame different.

11 Claims, 17 Drawing Sheets

U.S. PATENT DOCUMENTS

| | | | | |
|---|---|---|---|---|
| 5,515,509 | A * | 5/1996 | Rom | 709/228 |
| 5,715,475 | A * | 2/1998 | Munson et al. | 710/10 |
| 5,769,527 | A * | 6/1998 | Taylor et al. | 362/85 |
| 5,790,551 | A | 8/1998 | Chan | |
| 5,862,405 | A * | 1/1999 | Fukuda et al. | 710/9 |
| 5,886,992 | A * | 3/1999 | Raatikainen et al. | 370/410 |
| 6,011,801 | A | 1/2000 | Solomon | |
| 6,026,098 | A | 2/2000 | Kamoi et al. | |
| 6,141,349 | A | 10/2000 | Ikeda et al. | |
| 6,304,921 | B1 * | 10/2001 | Rooke | 710/4 |
| 6,504,853 | B1 * | 1/2003 | Lindgren et al. | 370/468 |
| 6,507,898 | B1 * | 1/2003 | Gibson et al. | 711/168 |
| 6,738,920 | B1 * | 5/2004 | Horne | 713/500 |
| 6,970,966 | B2 * | 11/2005 | Gemelli et al. | 710/305 |
| 7,023,867 | B1 * | 4/2006 | Park et al. | 370/419 |
| 2001/0021971 | A1 * | 9/2001 | Gibson et al. | 712/215 |
| 2002/0172191 | A1 * | 11/2002 | Harrison | 370/352 |
| 2002/0188781 | A1 * | 12/2002 | Schoch et al. | 710/107 |
| 2003/0036386 | A1 * | 2/2003 | Harrison | 455/438 |
| 2003/0074505 | A1 * | 4/2003 | Andreas et al. | 710/110 |
| 2003/0084112 | A1 * | 5/2003 | Curray et al. | 709/208 |
| 2003/0101307 | A1 * | 5/2003 | Gemelli et al. | 710/305 |
| 2003/0123473 | A1 * | 7/2003 | Satoh et al. | 370/442 |
| 2003/0128702 | A1 * | 7/2003 | Satoh et al. | 370/390 |
| 2004/0025047 | A1 * | 2/2004 | Mayne et al. | 713/200 |
| 2005/0165995 | A1 * | 7/2005 | Gemelli et al. | 710/305 |
| 2007/0288740 | A1 * | 12/2007 | Dale et al. | 713/2 |
| 2008/0069151 | A1 * | 3/2008 | Satoh et al. | 370/503 |
| 2008/0229092 | A1 * | 9/2008 | Dale et al. | 713/2 |

FOREIGN PATENT DOCUMENTS

| | | |
|---|---|---|
| EP | 1133081 | 9/2001 |
| WO | 9955036 | 10/1999 |

OTHER PUBLICATIONS

"VTDM: A Variable Bit Rate TDM Switch Architecture For Video Stream" Department of Information and Communication Engineering, University of Tokyo, (Udomkiat Bunworasate, Takayuki Muranaka, Terumasa Aoki, Hitoshi and Tadao Saito), Global Telecommunications Conference—Globecom' 99, pp. 1423-1427.

EP Search Report.

* cited by examiner

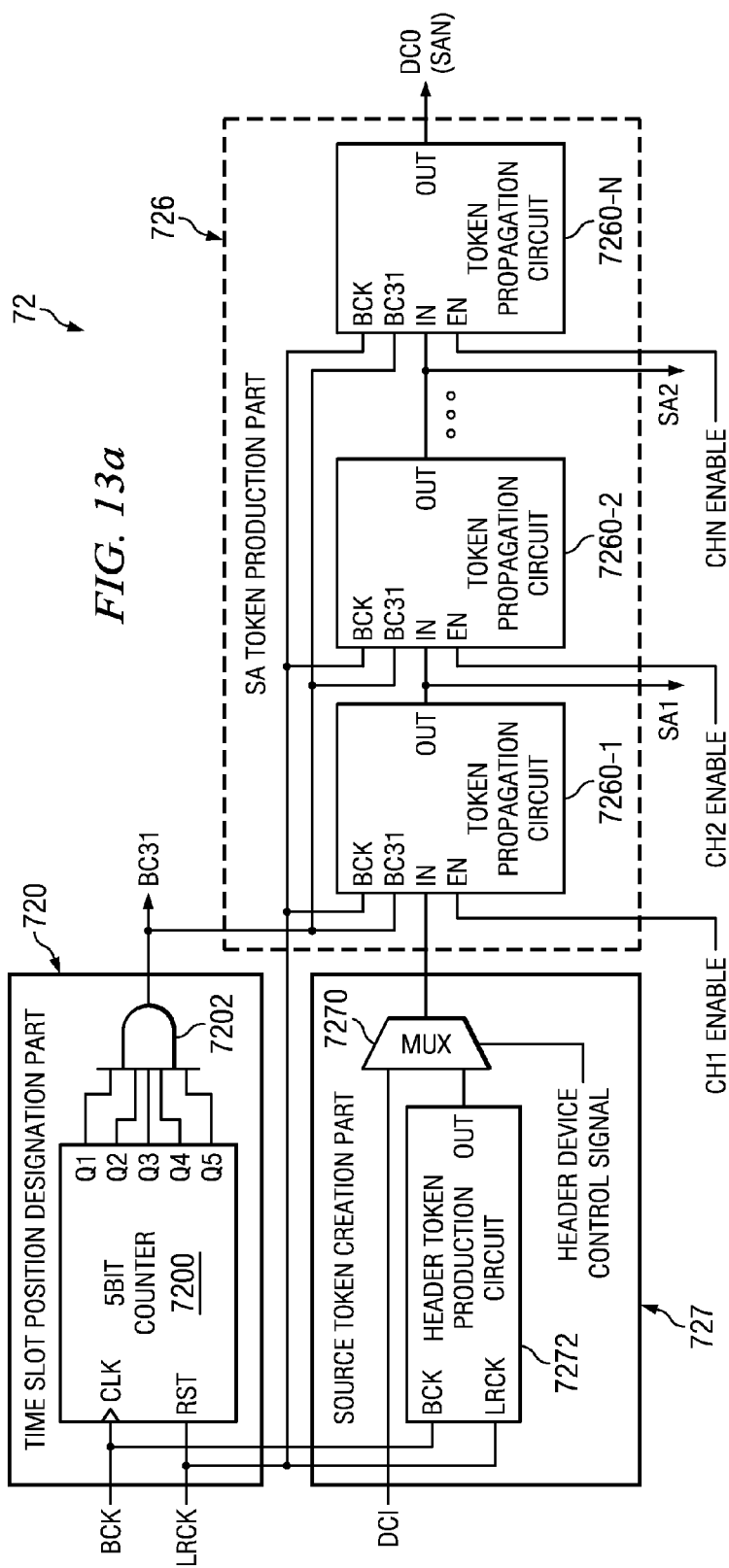
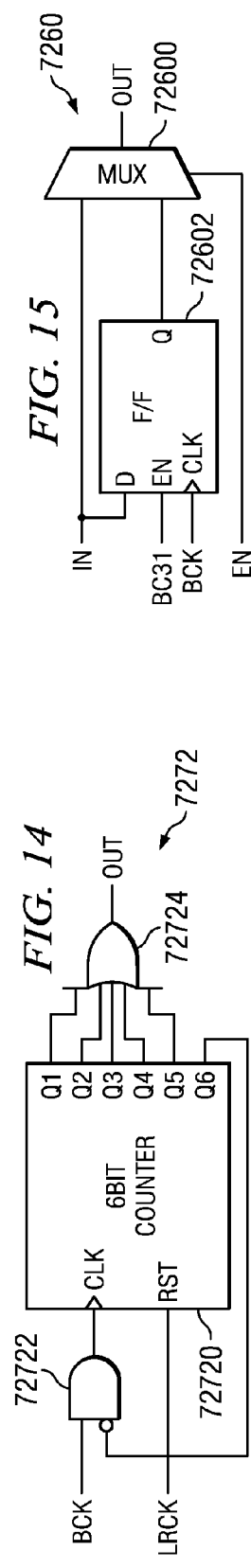
FIG. 13a
FIG. 15
FIG. 14

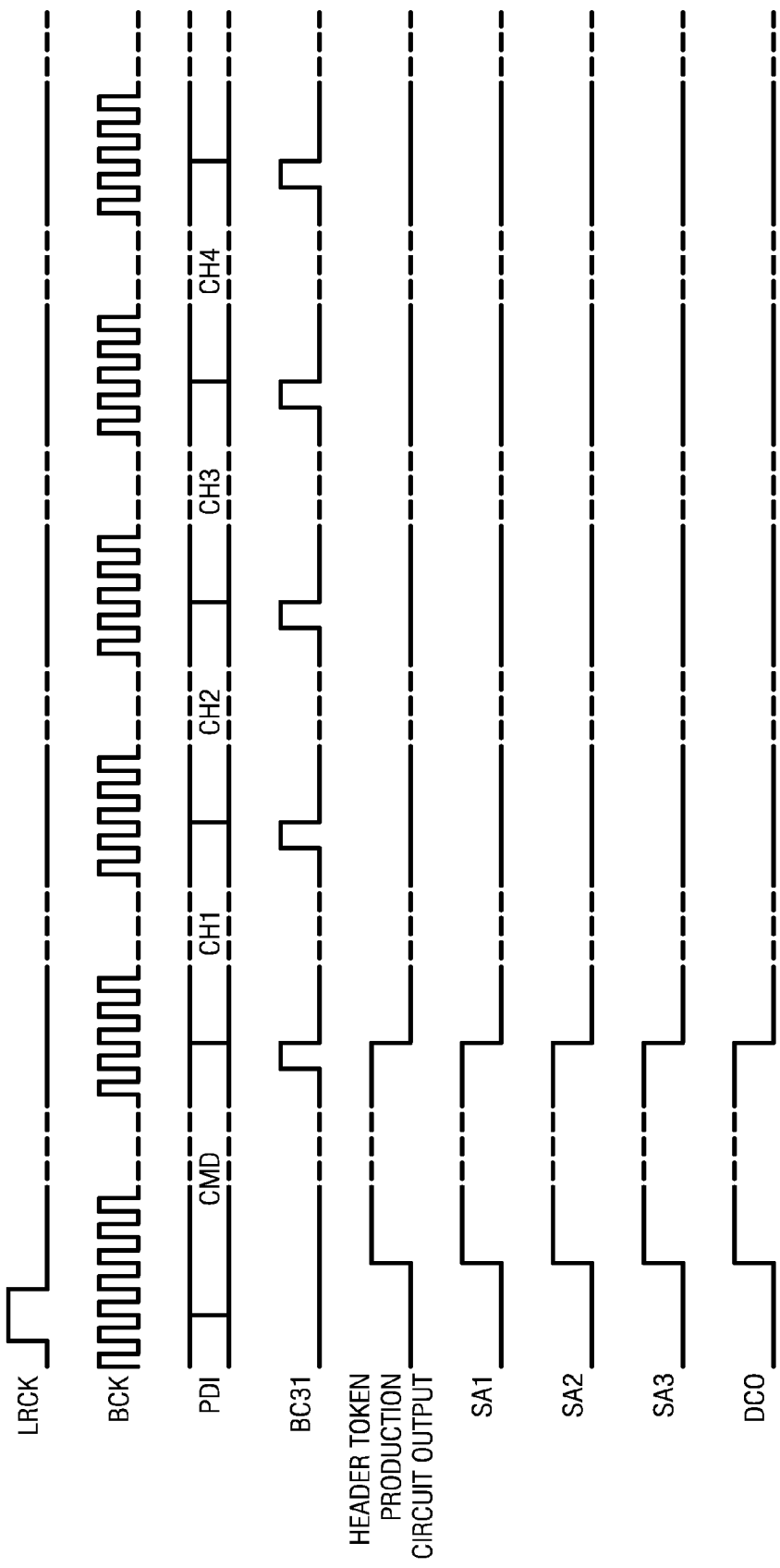

VARIABLE TIME DIVISION MULTIPLEX TRANSMISSION SYSTEM

FIELD OF THE INVENTION

This invention relates in general to communication. In particular, it relates to a method and devices for variable time division multiplex transmission within a system, such as a circuit, a device, etc.

BACKGROUND OF THE INVENTION

In the past, communication using time division multiplexing systems has been widely used in many fields. In such time division multiplex communication, one wireless or wired transmission path can be shared by time division multiplexing (TDM) multiple channels or circuits. With one type of TDM technology, multiple channels use one shared circuit, so the usage time of that shared circuit is equally divided and allocated in order to multiple channels. One method for equally dividing the usage time is a method where, for example, the usage time is segmented into multiple time slots and one is allocated to each of multiple channels. With this method, the bandwidth of a single circuit is allocated equally to each channel by using time slots in which the information from multiple channels has been allocated to each channel beforehand. In this case, a time slot will be allocated to each channel regardless of whether or not there are data to transmit. Another system of time division multiplex communication includes the asynchronous time division multiplex system. This system also transmits information in the same way as regular time division multiplex communication, but the difference is that this system is that rather than allocating time slots to specific channels beforehand, time slots are allocated as needed. Still another system includes the time division multiple access system that is used in wireless communications, such as for portable telephones, etc. This system is a system where one carrier frequency is shared by multiple receivers and stations, each for a short time.

Concerning the allocation of the transmission path or time slots for using the transmission path in time division multiplex communication systems, in broad terms, a first method is allocation by including the destination address (for example, a device identification code) in the data packet transmitted, a second is allocation by determining the packet arrangement information (time information) in advance and using that arrangement information as the destination information, and a third is allocation by transmitting an allocation signal along with the packet that is transmitted. An example of the first method is Ethernet (registered trademark) (IEEE 802.3), which is often used with LANs, and TCT/IP, which is used with PC networks, etc. These are configured so that the data packets (frames) include destination information. There are also ATM (asynchronous transfer mode) communication networks that have been widely disseminated in broadband communication networks. Here, high transmission bandwidths are maintained by using 53-byte ATM cells as the minimum unit and by allocating the transmission band to any specific equipment as necessary. In this case, since it is asynchronous, the ATM cell is divided into a 5-byte header that includes the leading synchronous bit and a 48-byte payload following that. The beginning and end of the ATM cell is identified by detecting the synchronous bit. The TCP/IP, LAN packets, and the like are also associated with the payload. Examples of the third method generally include microcomputer, DSP, and other memory map (input/output (I/O) map) systems.

Also, in the past there have been several methods for identifying the various devices when there is communication between the devices, such as various integrated circuit chips, units, equipment, etc., in circuits, devices, systems, etc. As one method, there is that in which a characteristic device identifier is used as the device identifier or address for communication in the system. Characteristic device identifiers include, for example, the number printed on the ROM during manufacture in an integrated circuit chip. Standards for using such a characteristic device identifier include the JTAG standard used in testing chip mounting on boards and IIC (example: Audio I/F (IIC)) used in many audio components. A second method includes assigning addresses externally to the branch, leaf device. An example where this method is used is the IEEE 1394 standard. In addition, a third method is where the device identifier, that is, the address, is predetermined by the system. An example of this is the SCSI-2 standard. In this standard, a specific address is recommended in advance by the operating system for devices such as printers, displays, etc.

Time division multiplex communication technology such as the, or time division multiplex communication technology such as time division multiple access technology, is constituted to allocate time slots equally, or to assign them equally to different channels when they are allocated. Thus the amount of information per unit time that each channel is to transmit or the transmission speed is fixed. Therefore, in systems in which multiple channels with different amounts of information or transmission speeds are mixed, the problem arises where efficient or optimal communication will not be accomplished using a single transmission path. Also, time slots are allocated as necessary in asynchronous multiplex systems, so that while the time slots are used efficiently, there is the problem that redundant information, such as the destination address, is included in the transmitted information.

They are also problems such as the following in the methods where the transmission path is allocated to different channels in time division multiplex communication. That is, with the first method, where data such as the destination address are included in the data packet transmitted, information other than the original data to be transmitted must also be included, the transmission efficiency for the original data drops, and all the data packets must always be monitored so that all the destination addresses are sent. With the second allocation method where the packet arrangement information is determined beforehand, the packet arrangement order must again be changed according to the destination address arrangement to accommodate changes to the system structure. Because of this, system connections will have to be changed, and programs, etc. will have to be changed, and the problem is that the overall system lacks flexibility. In addition, with the third allocation method, where an allocation signal is transmitted along with the data packet, for example, in a memory map (input/output (I/O) map) system, memory (I/O) space is allocated to all the devices, the device address and a device selection signal are associated, and communication with the destination device will be accomplished by producing a device selection signal for each device. The problems are that this system also lacks system flexibility, and device selection signals are required for the number of devices.

In addition, in the case of the first method, where the characteristic device identifier is used as the device identification method, particularly in the case of integrated circuit chips, the characteristic identifier is dependent on the device manufacturer, the type, such as the device function, etc, and a characteristic device different device identifier is allocated to devices manufactured by different manufacturers, even when they are the same type of device. Because of this, in systems such as audio components, it is not possible to simply replace, the device used with a device from a different manufacturer, even if it is the same time of device. To accomplish such a replacement, the device identifier of the device in the system prior to replacement must be replaced by the device identifier of the device after replacement. This also includes overwriting the software, overwriting the ROM contents, etc. Another problem is that, in order to use several of the same type of device in a system, devices with the same device identifier cannot be used, so that multiple device identifiers are printed on the ROM for one device as a countermeasure, and it must be possible to select one of them when a device is used. In addition, in systems that require other device identifiers instead of characteristic device identifiers, new identifiers or addresses must be given for the device. On the other hand, with the second method for device identification, an address must be assigned externally for a device, so that software and hardware for giving that address is required. With the third method for device identification, an address used by a specific device is preset in the operating system, so there are restrictions on address assignment. There are also restrictions on the number of devices that can be connected to the system.

Thus the purpose of this invention is to provide a time division multiplex transmission method and device that transmits information on multiple channel using a transmission path with variable time division multiplexing.

Another purpose is to provide a variable time division multiplex communication method and device that can automatically assign the sequence of time slots in allocation order to multiple channels for transmitting over the transmission path.

SUMMARY OF THE INVENTION

In order to accomplish the purpose, the time division multiplex transmission method according to this invention that transmits data on multiple channels using a transmission path with variable time division multiplexing is such that the data transmission is carried out using at least two or more different transmission bands.

With this invention, the data transmission with at least two or more transmission bands can include allocating the transmission path at different allocation rates for the multiple channels.

Also, with this invention, the data transmission can be carried out using consecutive time slots. In this case, the different transmission bands can be realized by making the number of time slots used in a prescribed time frame different. Here, the number of the time slots used for each of the channels can be variable. The number of the time slots used can also be predetermined, and the number of the time slots used can be 0 or a whole number that is 1 or greater. The different transmission bands can also be realized with time slots of different lengths that are used in a prescribed time frame.

Also, with this invention, each of the multiple channels transmits a time slot allocation token between the multiple channels to identify which of the consecutive time slots in the prescribed time frame is allocated to each channel. If a specific channel that has received said time slot allocation token will use the time slot, use of the time slot is started when said time slot allocation token is received, the time slots are used only for the number of time slots used, and use of the time slots is completed when use of the time slots in the number of time slots used is finished. In order to allocate the time slot that follows said time slot that was used last, from among the time slots in the number of the time slots used, to the next channel, from among the multiple channels, the time slot allocation token can be passed to the next channel. In this situation, the multiple channels have a daisy chain connection line that connects them to each other in a daisy chain, and the time slot allocation token can be transferred by the daisy chain connection line.

Also, with this invention, the multiple channels will include of multiples groups of channels. In this situation, the channel can be preformed with a channel device. Here, the device identifiers are given for the channel devices of each group by connecting each of the channel devices of the multiple groups by the multiple daisy chains, and channel device group identifiers are given for the channel devices of the multiple groups that are each connected by the multiple daisy chains. In this way, each of the channel devices from among the channel devices of the multiple groups can be identified by a combination of the channel device group identifier and the channel device identifier.

Also, a time division multiplex transmission system based on this invention that transmits or receives data on multiple channels using a single transmission path with time division multiplexing that includes: the multiple channel devices, the single transmission path that is connected to the multiple channel devices, and a circuit that determines the consecutive time slots for using the single transmission path and that determines the time slots in which each of the channel devices transmits or receives channel data using the consecutive time slots.

With this invention, the channel data can be transmitted with at least two or more different transmission bands. In this case, the different transmission bands can be realized by making the time slots used in a prescribed time frame different. With this invention, the number of the time slots used for each of the channel devices can be variable, or the number of the time slots used can be predetermined. Here, the number of the time slots used can be 0 or a whole number 1 or greater.

Also, with this invention, the system further includes a daisy chain connection line that connects the multiple channel devices, and it can be used to transfer the time slot allocation token for identifying which of the consecutive multiple time slots in the prescribed time frame has been allocated to each channel device devices can include: a channel data sources. In this case, each of the multiple channel devices can include: a memory circuit that stores the number of time slots used by the relevant channel device in order to identify which of the consecutive multiple time slots in the prescribed time frame is allocated to each of said channel devices, a circuit that enables use of the time slots for only the number of the time slots used when the time slot allocation token is received from the upstream side of the daisy chain connection line, and a circuit that sends the time slot allocation token to the downstream side of the daisy chain connection line in order to allocate the time slot following the time slot that was used last, from among the time slots in the number of time slots used, to the next channel device among the multiple channel devices.

BRIEF DESCRIPTION OF THE DRAWINGS

FIG. 5a shows the command field; FIG. 5b the expanded command field; and FIG. 5c the status field.

FIGS. 13a and 13b, taken together, constitute a circuit diagram that shows the details of time slot allocation circuit 72 shown in FIG. 3.

FIG. 14 is a circuit diagram that shows the details of the header token production circuit in FIG. 13.

FIG. 15 is a circuit diagram that shows the details of the token propagation circuit in FIG. 13.

FIG. 20 is a timing chart of the signals in the time slot allocation circuit in a case where all the ch enable signals are low in the header device.

DETAILED DESCRIPTION

Next, an embodiment of this invention will be explained in detail with reference to the figures. Note that, in the embodiment below, "channel" is explained as a channel for data to be transmitted between a master device and a slave device in a communication system. And "channel device" is explained as the portion of the channel in the slave device (for example, the IN device or OUT device discussed below) and master device by which the channel is realized.

Figure 1:
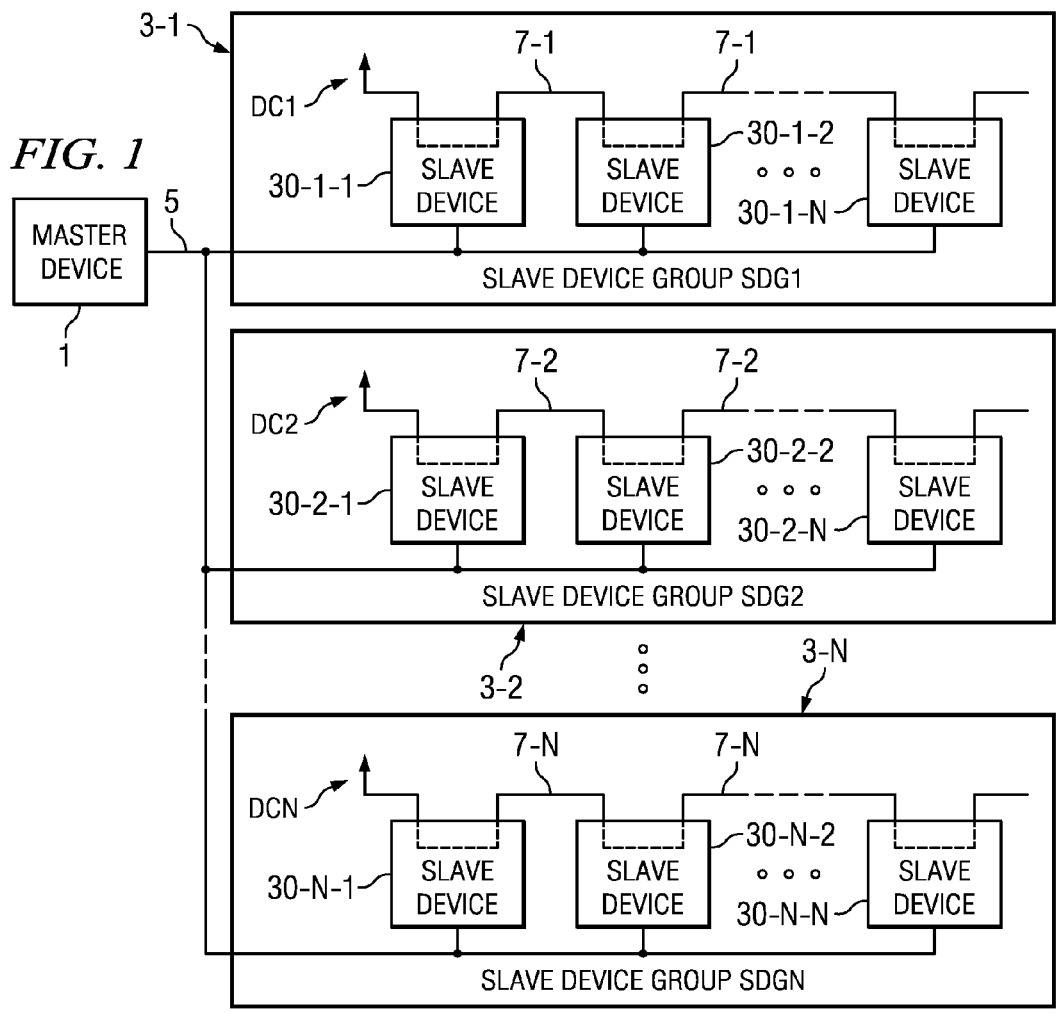
FIG. 1 is a block diagram that shows a communication system of an embodiment based on this invention.

First, communication system A, which is an embodiment of a basic constitution that incorporates this invention, is shown in FIG. 1. This system A includes one master device 1, multiple slave device groups 3-1~3-N (SDG1~N), and bus 5 that connects each of the slave device groups and master device 1. Each slave device group is furnished with at least one device, for example, multiple slave devices 30-1-1~30-1-N, or 30-2-1~30-2-N as shown. Each of these slave devices is connected to bus 5. Communication system A is further furnished with at least one daisy chain, for example DC1~DCN. One daisy chain is related to slave devices in one slave device group. For example, in slave device group 3-1, daisy chain DC1 connects multiple slave devices in a daisy chain arrangement with daisy chain connection line 7-1. Daisy chain connection lines 7-2~7-N are furnished for the other slave device groups.

In communication system A shown in FIG. 1, control signals, such as commands, and data are transmitted over bus 5 between master device 1 and each slave device 30 in each slave device group SDG1~N. This bus is a serial bus, but it can also be constructed with a parallel bus. The device identifiers used for this transmission are automatically given by each daisy chain DC1~DCN furnished for each slave device group 3-1~3-N. That is, each device identifier (device ID) for slave devices 30-1-1~30-1-N in slave device group SDG1 is constituted so that it can be given by transmitting a device ID provision token or resource allocation token (discussed later) between slave devices via daisy chain DC1. When the device IDs given to slave devices 30-1-1~30-1-N by daisy chain DC1 are known beforehand when the system is designed, these device IDs can be stored beforehand in the memory of master device 1. Note that, when they have not been specified when the system is designed, the device IDs allocated to the slave devices can also be maintained in the master device by communication between the master device and the slave device. Note that, as in FIG. 1, a slave device group identifier or daisy chain identifier will be required to distinguish the slave devices within the device group. Such a slave device group identifier can be stored in the slave device ROM or RAM furnished in each slave device group, or it can be set by an external setting terminal (H is "1" and L is "2").

The device ID (there are cases where a slave device group identifier is also included) given to each of the slave devices in the above way can be used as slave device numbers in communication system A, that is, in-system numbers, or they can be used as the sequence in a prescribed order such as the allocation order of sharable resources in the system as described above.

Concerning operation of communication system A, this system can be operated using time division multiplexing (VTDMCA; variable time division multiplex command and audio data) as discussed below, for example. For example, in variable time division multiplexing, multiple consecutive time slots are furnished for each fixed communication time frame, and by then allocating those time slots to each of multiple channels, the system can be operated to communicate by using a fixed communication format.

Next, audio multi-chip system B, which is a first embodiment that makes this communication system A of FIG. 1 more concrete, will be explained with reference to FIG. 2. This system B is equipped with a digital signal processor (DSP) 1B as the master device. It is also equipped with N slave devices 30-1-1B, 30-1-2B ... 30-1-NB (only 2 are shown) for the input IN device group and N slave devices 30-2-1B, 30-2-2B ... 30-2-NB (only 2 are shown) for the output OUT device group, as slave devices. Thus system B is equipped with two slave device groups. Here the IN devices (devices that received input from the DSP) include a digital-analog converter DAC and other devices, and the OUT devices (devices that provide output to the DSP) include an analog-digital converter ADC and other devices. Note that, as discussed below, an IN/OUT device such as a codec (CODEC) and a NO device without input/output for signal processing, such as a PLL, can also be included in the system. Conductor 50B and conductor 52B are provided in system B as a bus for connecting DSP 1B and IN devices 30-1-1B~NB and OUT devices 30-2-1B~NB to each other. That is, one connection line is furnished for transmission from the master device to multiple slave devices, and one connection line is furnished for transmission from multiple slave devices to the master device. Conductor 60 for providing a frame synchronous clock and conductor 62 for providing a port synchronous clock are further illustrated. System B is also equipped with daisy chain DC1B for devices 30-1-1B~NB of the IN device group and daisy chain DC2B for the devices 30-2-1B~NB of the OUT device group, as daisy chains for the two slave device groups. Note that, as discussed below, "1" is given as the device ID for IN device 30-1-1B, and "2" is given as that for IN device 30-1-2B. In the same way, "1" is given as the device ID for OUT device 30-2-1B and "2" for OUT device 30-2-2B. In order to identify these two device groups, a slave device group identifier is further given by a method such as prerecording it on the ROMs of the devices belonging to each group. For example, "1" is given for the IN device group and "2" for the OUT device group.

Specifically, a digital signal processor that is generally available can be used for DSP 1B. It is also equipped with a port that provides a frame synchronous clock for determining the communication frame for transmitting FSX and the communication frame for receiving FSR, a port for providing a port synchronous clock for transmitting CLKX and a port synchronous clock for receiving CLKR, and a data transmission port DX for transmitting commands and data and a data receiving port DR for receiving them, that constitute the serial ports of the DSP. At the same time, each IN device and OUT device is equipped with an LRCK port that receives the frame synchronous clock over conductor 60, a BCK port that receives the port synchronous clock over conductor 62, an input port PDI that receives data and commands from DSP 1B over conductor 50B, and an output port PDO that outputs statuses and data to DSP 1B over conductor 52B. These devices are further equipped with a daisy chain input port DCI and output port DCO for giving a device ID to each device. These ports are connected to either daisy chain connection line 7-1B or 7-2B that constitute the daisy chain. Note that the analog output terminal when the IN device is a DAC is not shown, and the analog input terminal when the OUT device is an ADC is not shown, and only the lines for transmitting the digital signal are shown.

Next the circuitry for assigning device IDs (or device numbers) using the daisy chain will be explained in detail with reference to FIG. 3. Note that in FIG. 3, only two IN devices 30-1-1B and 30-1-2B in system B in FIG. 2 are shown, this arrangement being the same as that for the other IN devices and OUT devices. IN device 30-1-1B is equipped with device ID assignment circuit 70-1B for assigning a device ID to said device, and time slot allocation circuit 72-1B that allocates the sequence of use of the bus (in this example, time slots in a specific sequence within the many consecutive time slots in a communication frame), which is the sharable resource, to said device, as the circuitry that constitutes a part of daisy chain DC1B. The input to these circuits is connected to upstream side connection line 7-1BU1 through the DCI port and their output is connected to downstream side connection line 7-1BD1 through the DCO port. Note that upstream side connection line 7-1BU1 is connected to the reference potential, and downstream side connection line 7-1BD1 is connected to upstream side connection line 7-1BU2 of one downstream IN device 30-1-2B. IN device 30-1-2B is likewise equipped with the same ID assignment circuit 70-2B and slot allocation circuit 72-2B, and downstream side connection line 7-1BD2 is further connected to the upstream side connection line of the IN device one position lower. The details of these circuits will be discussed later.

Figure 4:
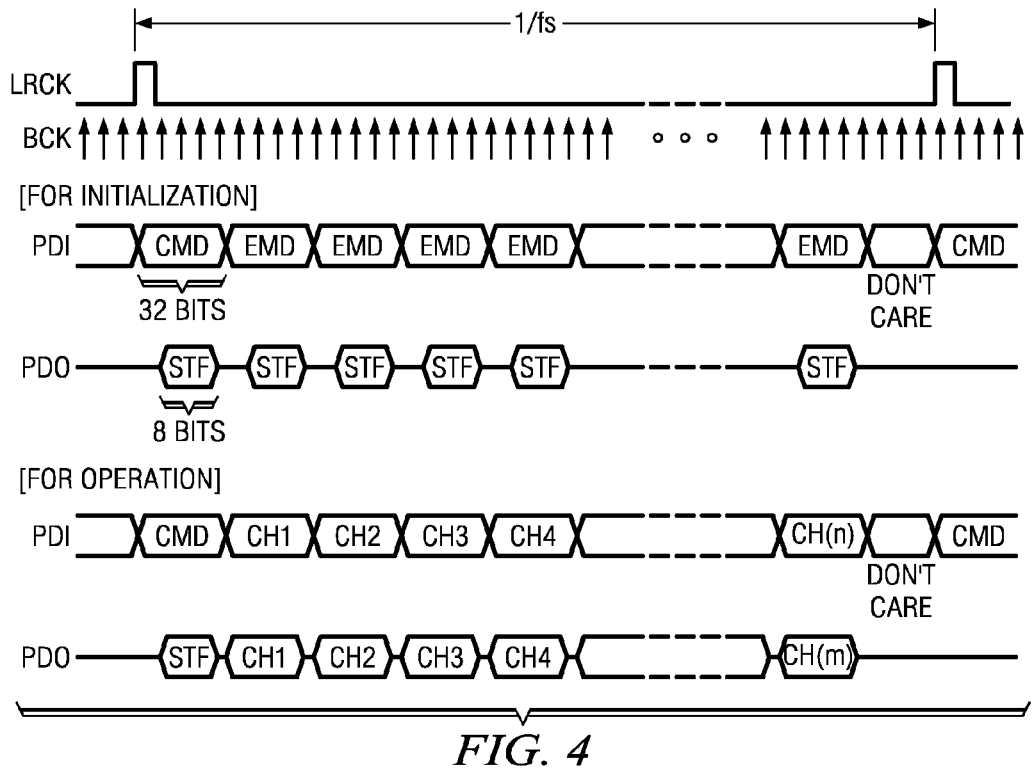
FIG. 4 shows the communication frame in variable time division multiplex communication (VTDMCA) used with the system in FIG. 2, and the format of the transmission data (PDI input and PDO output) transmitted in that frame at initialization and during operation.

Next, the overall operation of audio multi-chip system B in FIG. 2 will be explained with reference to FIG. 4. The format of the variable time division multiplex communication (VTDMCA) used in this system is shown in FIG. 4. Specifically, LRCK, which is the frame synchronous clock, has cycle 1/fs which is the inverse of the frequency fs that is the sampling frequency of the audio signal. Its duty cycle is much smaller than 50%, compared to the 50% duty cycle in the interface (audio serial interface) used in conventional audio components, and has section "H" which equals two cycles of clock BCK, for example. This is to ensure compatibility by making identification of the VTDMCA communication interface based on this invention and a conventional communication interface possible, to enable coexistence with the conventional system based on differences in the duty cycle. Next, many consecutive time slots are determined during one cycle of the frame synchronous clock according to the frequency of port synchronous clock BCK, and handling of multiple channels is thus enabled. Time division multiplex communication is realized in this way. FIG. 4 also shows the input format of the data and commands that are input to and output from the IN device and OUT device input port PDI and the output format of data and commands that are output from the output port PDO during initialization and operation within the period of a communication frame that has many time slots. During initialization, the input PDI format, as shown, comprises a command field CMD at the header and many expanded command fields EMD following it. Note that each field has 32 bits and a length that is contained within the period of the one time slot. For the output PDO format from the IN devices, etc., 8 bit status fields STF are consecutive, and each status field includes status data stored in a register. Next, during operation, the input PDI format has a 32 bit command field (CMD) at the header, and following that there are audio channel fields Ch1~Ch(n) for each of n channels ch1~chN. The output PDO format has an 8 bit status field (STF) at the header, and following that there audio channel fields Ch1~Ch(m) for each of m channels. Note that the number of input channels and output channels can be different, so that the number m and number n of channels can be the same or a different number. That is, during operation the IN devices receive only input data, so that they use only the PDI format, and the OUT devices output only output data, so they use only the PDO format. As is clear from the above, with this invented VTDMCA, a serial bus is used with time division multiplexing.

Figure 5A:
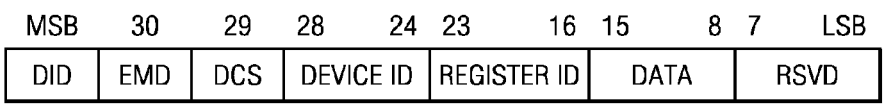
FIGS. 5a-5c show the structure of the command field and expanded command field in the transmission format shown in FIG. 4.
Figure 5B:
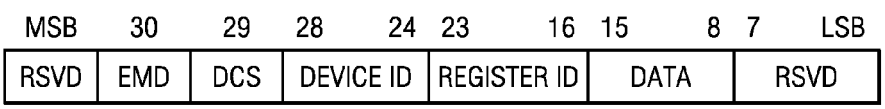

Next, the command field, expanded command field, and audio channel field will be explained with reference to FIGS. 5a-5c. Specifically, FIG. 5a shows the command field structure. The DID field at the header of the command indicates whether or not the device ID determination sequence is executed. When this bit is "1" the determination sequence is executed, and when it is "0" the following command is executed. The EMD field indicates whether or not there is a continuation of the expanded command field shown in FIG. 4. When this bit is "1," it indicates that the next field is an expanded command field, and when it is "0," it indicates that the next field is an audio channel field. The daisy chain select field DCS is a field that indicates the slave device group. In the example shown in FIG. 2, 0 is allocated to the IN devices and 1 to the OUT devices. The "device ID" field is the device number given by the device ID determination sequence and is used for device identification. When this "device ID" field is "0x00" none of the devices have been selected, and when it is "0x1 F" all of the devices have been selected. For this setting, the same setting can be performed at the same time (for example, DAC enable, mute on/off, etc.). The "register ID" field is a number that is assigned to each characteristic internal register for an IN device or OUT device and is used for register identification. This field includes a R/W field and designates writing or reading from the internal register. The "data" field includes data for the designated internal register of the designated device selected by the device ID and register ID.

Next, the expanded command field shown in FIG. 5b will be explained. This field has the same structure as the command field in FIG. 5a, except when the MSB bit is not used (rvd). Note that only an expanded command field can be selected after this field.

Figure 5C:
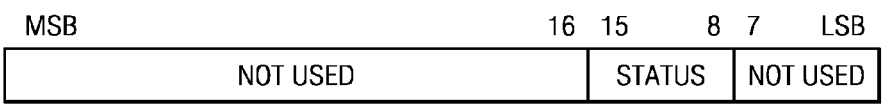

FIG. 5c shows a status field STF. This uses only the 8 bits 8-15 of the 32 bits (shown as 8 bits in FIG. 4). The status field is used to reply to a request in the command field or expanded command field and to read the status of the slave device stored in the register in the slave device and to send it to DSP 1 B.

Finally, the audio channel field, although not shown, is used for audio data transmission. Each audio channel field is treated as audio data for the device selected by the command field preceding the fields. Note that the audio format can be selected arbitrarily for each device.

Figure 2:
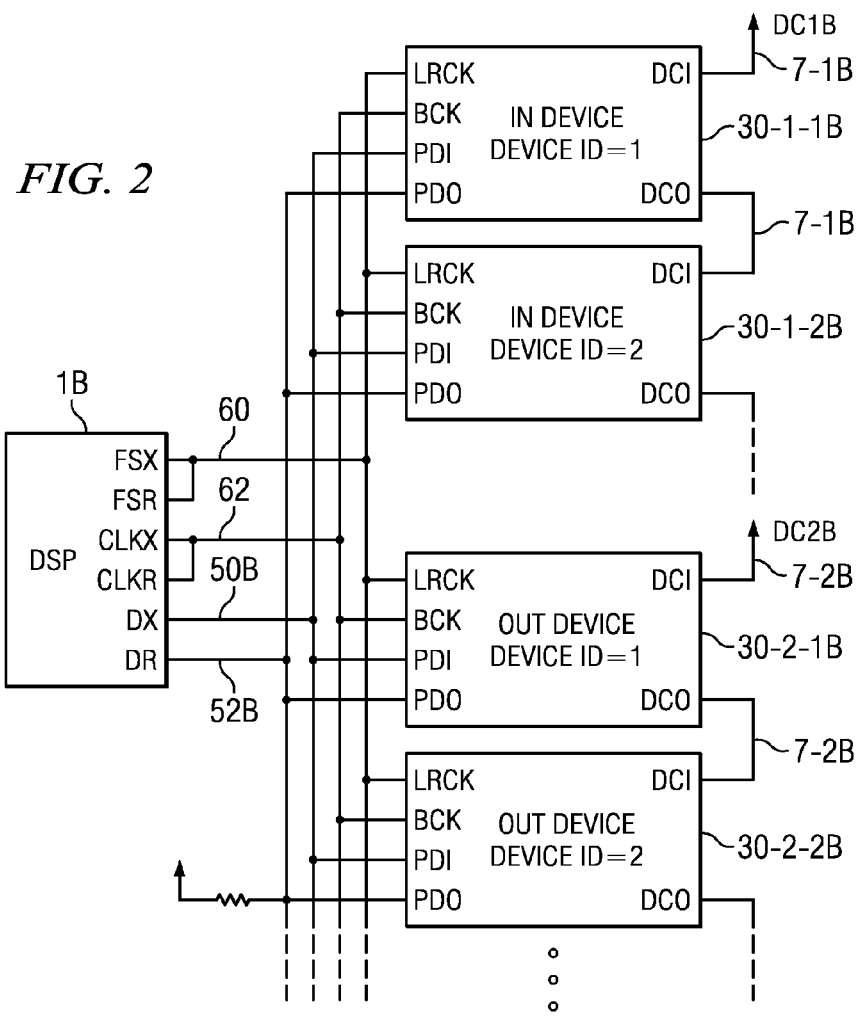
FIG. 2 is a block diagram that shows audio multi-chip system B, which is a first embodiment of the communication system in FIG. 1.
Figure 3:
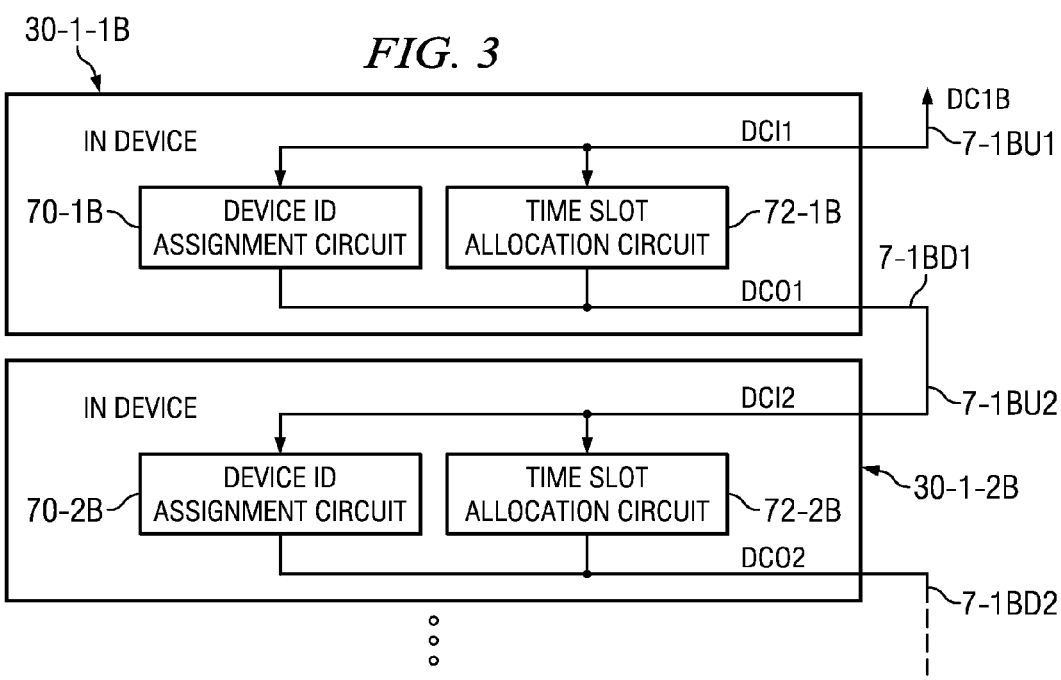
FIG. 3 is a block diagram that shows the device ID assignment circuit and time slot allocation circuit furnished inside each slave device in FIG. 2.

As can be seen from the formats explained above, although it is not shown, a register that the audio channel occupied by each device is furnished for the IN devices and OUT devices, which are the slave devices shown in FIGS. 2 and 3. It is also preferable that a register for storing the device ID of each device be furnished for confirmation. As for the internal register in each device, as described above, control data cannot only be written in the internal register of each device, but also it can be read from the internal register. With the system in FIG. 2, a PDO port is used as a read port, and the PDO ports of all the devices can be wired or connected by making the PDO Hiz (high impedance, that is, open) output. Register read/write timing can be set arbitrarily.

Next the overall operation of audio multi-chip system B shown in FIG. 2 will be explained with reference to the flow chart in FIG. 6. Note that this flow chart indicates control from the host controller (the DSP in this example). First it is determined at step 60 whether or not the VTDMCA communication mode will be used. This determination is normally made at the system design stage. When it is determined not to be the VTDMCA mode, a conventional operating mode is used at step 61. Audio Serial Interface and Host Serial Interface are used with this conventional mode. On the other hand, when it is determined that VTDMCA mode will be used, the host controller executes initialization to use the VTDMCA mode at step 62. That is, the serial port of DSP 1B is initialized and the width of section "H" of frame synchronous clock LRCK, the number of BCK clocks, the data length, the frame length, etc. are set. After that the VTDMCA mode determination sequence is produced at step 63. The device ID determination sequence is started by producing the PDI input for initialization shown in FIG. 4 (the DID field in FIG. 5a is "1"), and thus device IDs are automatically given for the IN devices and OUT devices. Next, if required, the device IDs of all the IN devices and OUT devices are confirmed at step 64. This is accomplished by DSP 1B reading the device ID stored in the internal register of each device. That is, it is realized by DSP 1B sending a command, via the PDI input, to each slave device to read the internal register that stores the device ID, and in response to this, each slave device sending the device ID that is read to DSP 1B via the PDO output. DSP 1B matches each received slave device ID to the slave device IDs already stored in the memory of the DSP itself. All the slave devices are additionally initialized by using the PDI data expanded command field (shown in FIG. 5b) at step 64. After initialization is completed, at the next step 65 DSP 1B sends PDI input to an IN device or receives PDO output from an OUT device. For example, during operation with PDI input to an IN device, DSP 1B first sends a write or read command field to a certain IN device (any can be selected), and next sends an audio channel field. The assignment of audio channel fields is determined by initialization performed in advance for all the devices. If the command field is read at this time, the contents of the register designated by the command field are output from the PDO port to the status field. A command field for an OUT device is the same, and only an audio channel field changes transmission to audio data.

Next, details of the operation of the above-mentioned system B will be explained with reference to FIGS. 7-21.

Figure 6:
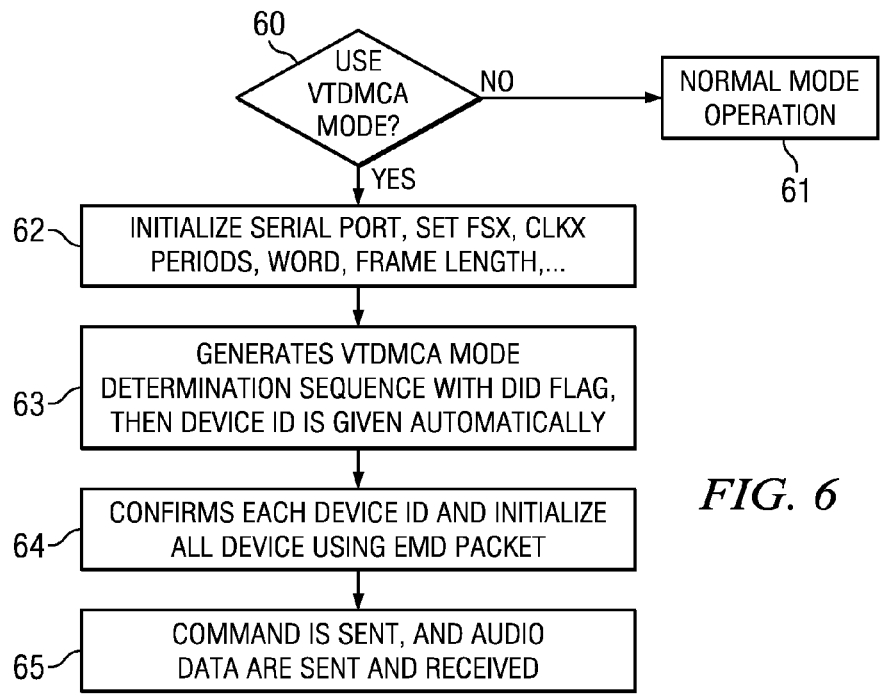
FIG. 6 is a flow chart that shows the overall operation of audio multi-chip system B shown in FIG. 2.
Figure 7:
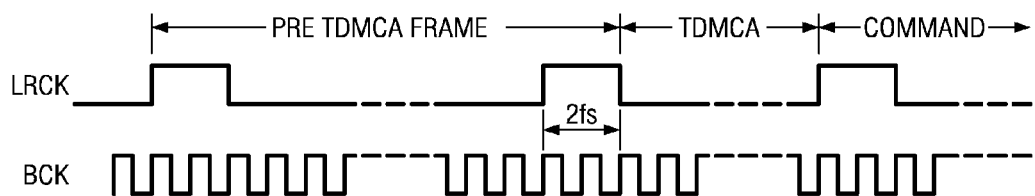
FIG. 7 shows the timing of clocks LRCK and BCK for determining the VTDMCA mode.

FIG. 7 shows the timing of the clocks LRCK and BCK for determining the VTDMCA mode that DSP 1B produces at step 62 in FIG. 6. As shown in the figure, section H "1" of LRCK equals two BCK clocks. In addition, in order to prevent malfunctions, the IN device and OUT device sides operate to settle on a VTDMCA mode with two detections (in FIG. 7, the first is shown as a pre VTDMCA frame and the second as the VTDMCA frame). The reason that section H "1" of LRCK equals two BCK clocks is so that, as stated above, it can be distinguished from the 50% LRCK duty cycle of the audio serial interface in the conventional operating mode.

Figure 8:
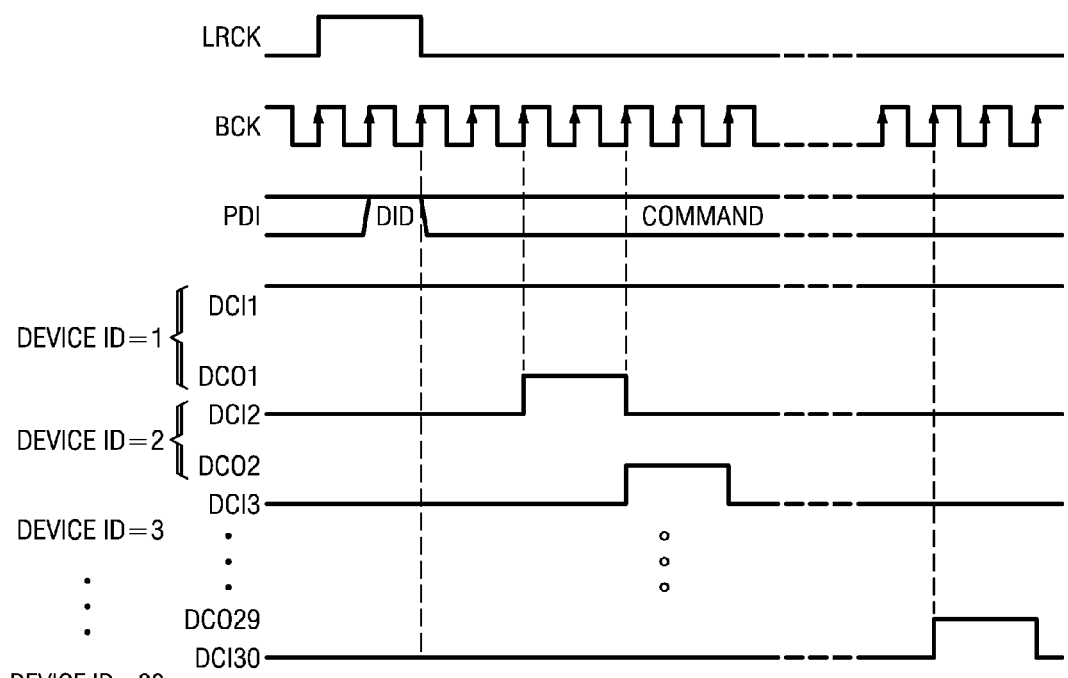
FIG. 8 is a timing chart that shows the various signals in the device ID assignment sequence.

Next, the timing of the device ID assignment sequence will be explained with reference to FIG. 8. Note that this sequence is what is executed at step 63 in FIG. 6. The device ID determination sequence is performed independently for the IN device group and the OUT device group, and it is performed by transmitting a device ID assignment token (DID token) from the very top level of the daisy chain downstream. The explanation below deals only with IN devices, but the same operation is performed for the OUT devices. Specifically, a DID token is formed by the reference voltage that is connected to the most upstream point of the daisy chain. First, the PDI data input to the PDI port in FIG. 8 includes a command field in which the above-mentioned DID field is set to "1" to start the device ID assignment sequence. The IN device that receives this command, when it is the IN device at the top level of the daisy chain, determines that the device ID=1 when the clock LRCK is high because a high DID token is always received at the DCI 1 port. This DID token is then transmitted to the downstream IN device. The downstream IN device determines its own device ID based on the number of BCK clocks counted until it receives the DID token (1 is determined per 2 clocks). As shown in FIG. 8, the IN device on the next level downstream from the IN device at the top level (also called the header device) counts the BCK clocks until DCI 2 connected to DCO 1 becomes high, and a count of 4 give a device ID=2. Next, with the downstream IN device, count 6 gives device ID=3. That is, the device ID is determined by using only the second digit and higher of the internal counter. The IN devices can determine the device IDs executed by transmitting the DID token from the most upstream point down the daisy chain, as above. More concisely, all the slave devices determine the device ID determination sequence with the DID field in the command field. Then the DID token is sent on, synchronized with BCK, in sequence from the first slave device, and each slave device confirms itself which number it is itself connected to at the cycle where "high" appears at the DCI port, and the DID token is also output on to the next device. By fixing the DCI port of the header device at "1," device ID=1 becomes the recognition starting point.

By using this device ID determination method, even when there is a plurality of the same type of devices present in the same system, the master device, such as a DSP, can specify each of them. With this method, there is the advantage that the number of devices that can be identified is not limited to the number of master device terminals that can be used, compared to a method where devices are recognized by simply using the external terminals of the master device. That is, by using the daisy chain of this invention, there will be no such conventional restrictions, and the number of slave devices can be increased regardless of an increase in the number of master device setting terminals.

Figure 9:
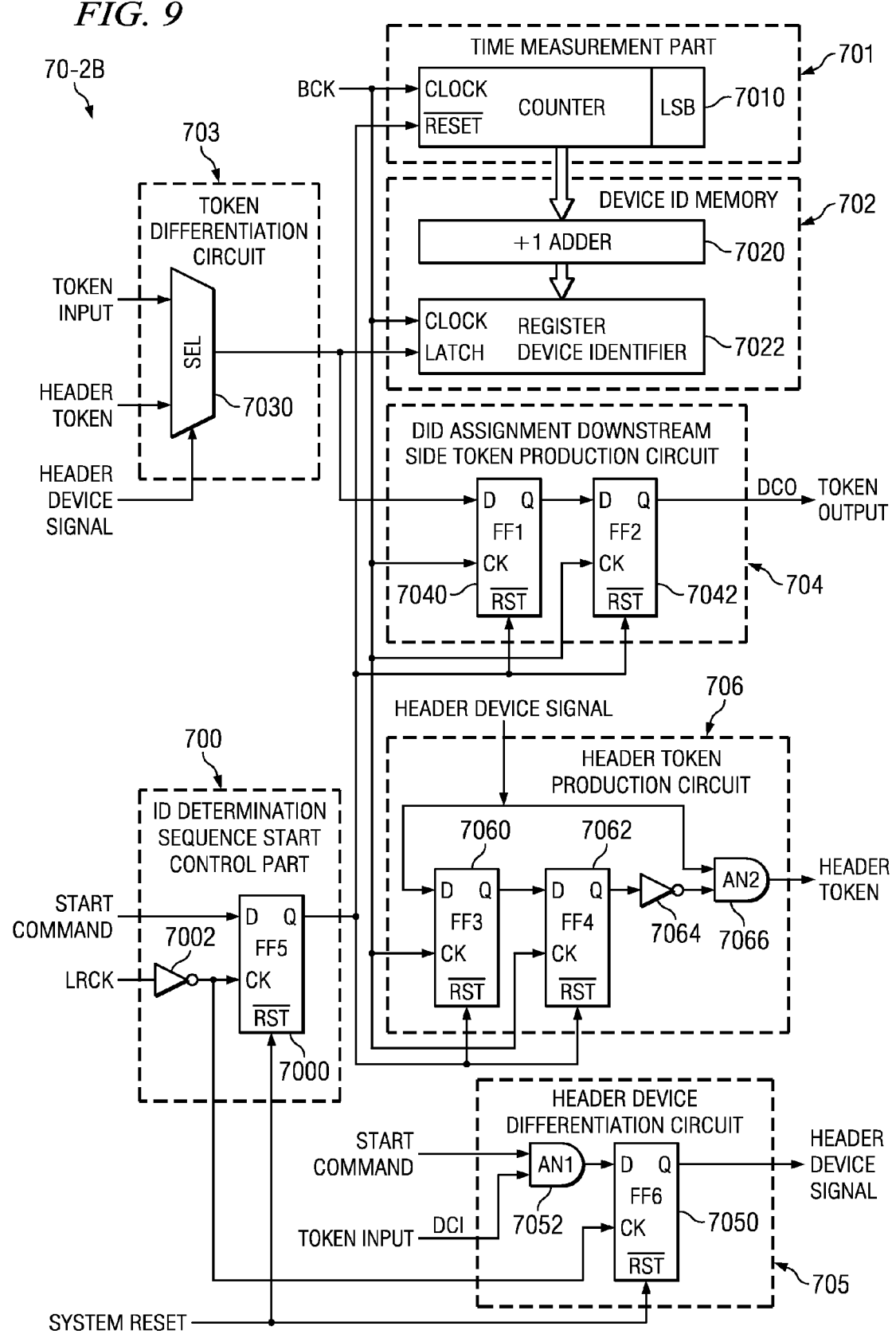
FIG. 9 is a circuit diagram that shows the details of device ID assignment circuit 70 shown in FIG. 3.

Next, one of the device ID assignment circuits 70 shown in FIG. 3 that executes the device ID granting sequence will be explained in detail with reference to FIG. 9. Note that the other device ID assignment circuit is the same circuit, so this will also explain circuit 70-2B in detail. Device ID assignment circuit 70-2B, as shown in the figure, is constituted to receive clock LRCK and clock BCK, device identifier DID assignment input of the DCI port, a device ID determination sequence start command, and a system rest signal as input, and to generate a DID assignment token output to the DCO port as output. Note that the start command is the signal "1" in the DID field in the command field explained in FIG. 8. Also, the system reset signal is a signal that will be high when the system reset is cancelled. This circuit, which has these inputs and outputs, is broadly constituted with device ID determination sequence start control part 700, time measurement part 701, device ID memory part 702, token differentiation circuit 703, DID assignment downstream side token production circuit 704, header device (most upstream device) differentiation circuit 705, and header token production circuit 706 as shown in the figure. Specifically, sequence start control part 700 is equipped with D type flip-flop F/F5 7000. It has D input, CK input, reset RST input, and Q output, and the CK terminal connects receiving of clock LRCK through inverter 7002. The system reset signal of this F/F5 is high, and it generates a high Q output in response to clock LRCK when the start command is high. This high Q output is a signal that indicates the period from the start of the determination sequence to completion (equal to 1 frame period).

On the other hand, time measurement part 701 includes counter 7010, and this counter 7010 is equipped with a CLOCK terminal that receives clock BCK and a RESET terminal that is connected to the F/F5 Q output. This counter is reset by the falling edge of the F/F2 output received at the RESET terminal, then time measurement is started from when the determination sequence starts by counting the clocks BOK received after the start of the device ID determination sequence, and the count value is generated for that output as the result of the time measurement. Device ID memory part 702 is includes with +1 adder 7020 and register 7022. The input for +1 adder 7020 is connected so that the counter output is received, excluding the LSB of counter 7010, and an output is generated with 1 added to the counter output. For this reason, two clock's worth of clock BCK are counted as one device identifier. Register 7022 has a LATCH terminal, which receives token input and has an input that is connected to the output of +1 adder 7020, in addition to the CLOCK terminal, which receives clock BCK. Register 7022 latches adder output, which is the result of the time measurement from the start of the determination sequence until token input is received, in response to clock BCK when a high token input is received, and stores the adder output as the device ID of said device. DID assignment downstream side token production part 704, which includes device ID assignment circuit 70-2B, is composed of D type flip-flop F/F1 7040 and ID type flip-flop F/F2 7042. These flip-flops are equipped with RST inputs that receive the Q output of F/F5 7000 and a CK terminal that receives clock BCK. These D inputs are connected so that F/F1 receives the token from token differentiation circuit 703 and so that F/F2 with receive the Q output of F/F1. With this constitution, F/F1 and F/F2 operate so that, after being reset when the determination sequence starts (reset by the falling edge), when a token is received through token differentiation circuit 703, then the received token delayed by two clocks' worth of clock BCK (two-stage F/F) will be produced for the Q output of F/F2 as the downstream side DID assignment token. The above is the general operation of a device, including the header device, but in the case of the header device, the header token must be produced separately because the DID assignment token input is always high. For this reason, device ID assignment circuit 70-2B is further equipped with circuits 703, 705, and 706, as stated above.

Specifically, token differentiation circuit 703 is equipped with selector 7030, and it has an input that receives the DID assignment token (this is always a high signal with the header device) and an input that receives the header token (discussed below). It is also furnished with a control input that receives a header device signal indicating (when high) that said device is the header device. The selector operates to pass the header token to the output when the header device signal is high, and to pass the DID assignment token from upstream when it is low. Header device differentiation circuit 705 is equipped with flip-flop F/F6 7050 and AND gate 7052. F/F6 is furnished with a reset input that receives the sequences reset signal, a CK terminal that receives the clock LRCK via inverter 7002, and a D terminal that is connected to the output of AND gate 7052. The AND gate is furnished with an input that receives the start command and an input that receives the DID assignment token input. In the case of the header device, the DCI is always high, so AND gate AN1 7052 produces a high output when the start command goes high. F/F6, which receives this output, generates a high Q output in response to clock LRCK going low, and this then becomes low the next time clock LRCK goes low (refer to FIG. 10). At the same time, with a downstream device other than the header device, the start command and the DCI input will not simultaneously become high, so that the Q output of F/F6 always stays low. In this way, a high Q output from F/F6 indicates that said device is the header device.

Figure 10:
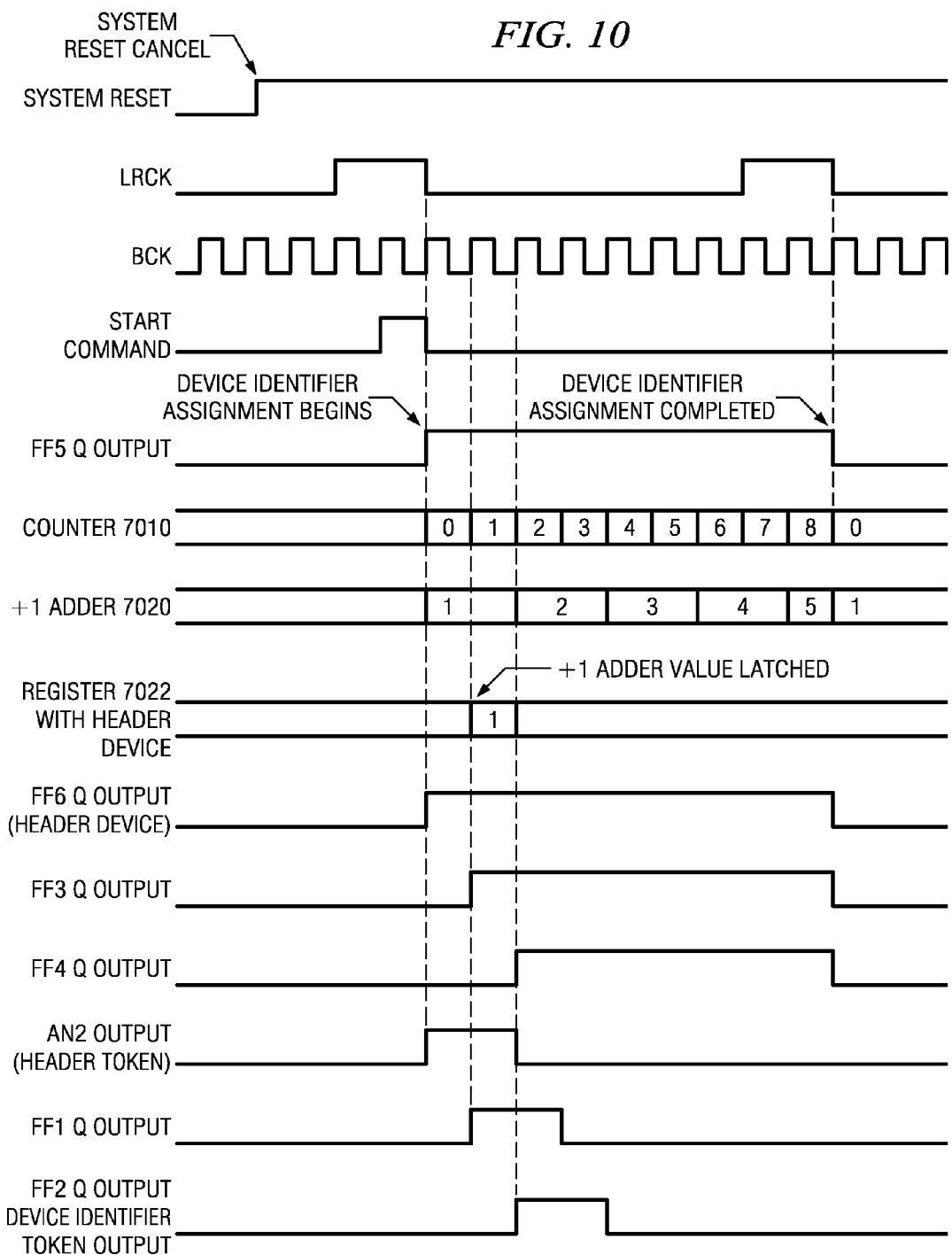
FIG. 10 is a timing chart illustrating the operation of device ID assignment circuit 70, shown in FIG. 9, in the header device (most upstream device).

Next, header token production circuit 706 produces a token especially for the header device, since DCI is always high with the header device. Specifically, circuit 706 is equipped with F/F3 7060 and F/F4 7062, inverter 7064, and AND gate AN2 7066. F/F3 and F/F4 are equipped with a reset terminal that receives the Q output of F/F5 and a CK terminal that receives clock BCK. F/F3 is also furnished with a D terminal that receives the header device signal (F/F6 Q output), and F/F4 is furnished with a D terminal connected to the F/F3 Q output. Because of this connection, F/F3 and F/F4 each operate to delay the forward edge of the header device signal 1 clock, as shown in FIG. 10, producing a 2 clock delay. AND gate AN2, which receives the delayed signal inverted by inverter 7064 and the header device signal, generates a high signal for the duration of two clock cycles worth of clock BCK from the start of the communication frame (fall of clock LRCK.) This output includes the header token for the header device (refer to FIG. 10). This header token, as stated above, is supplied to token differentiation circuit 703. Note that with downstream devices other than the header device, the header device signal is low, and thus the output of AND gate AN2 will always be low.

Figure 11:
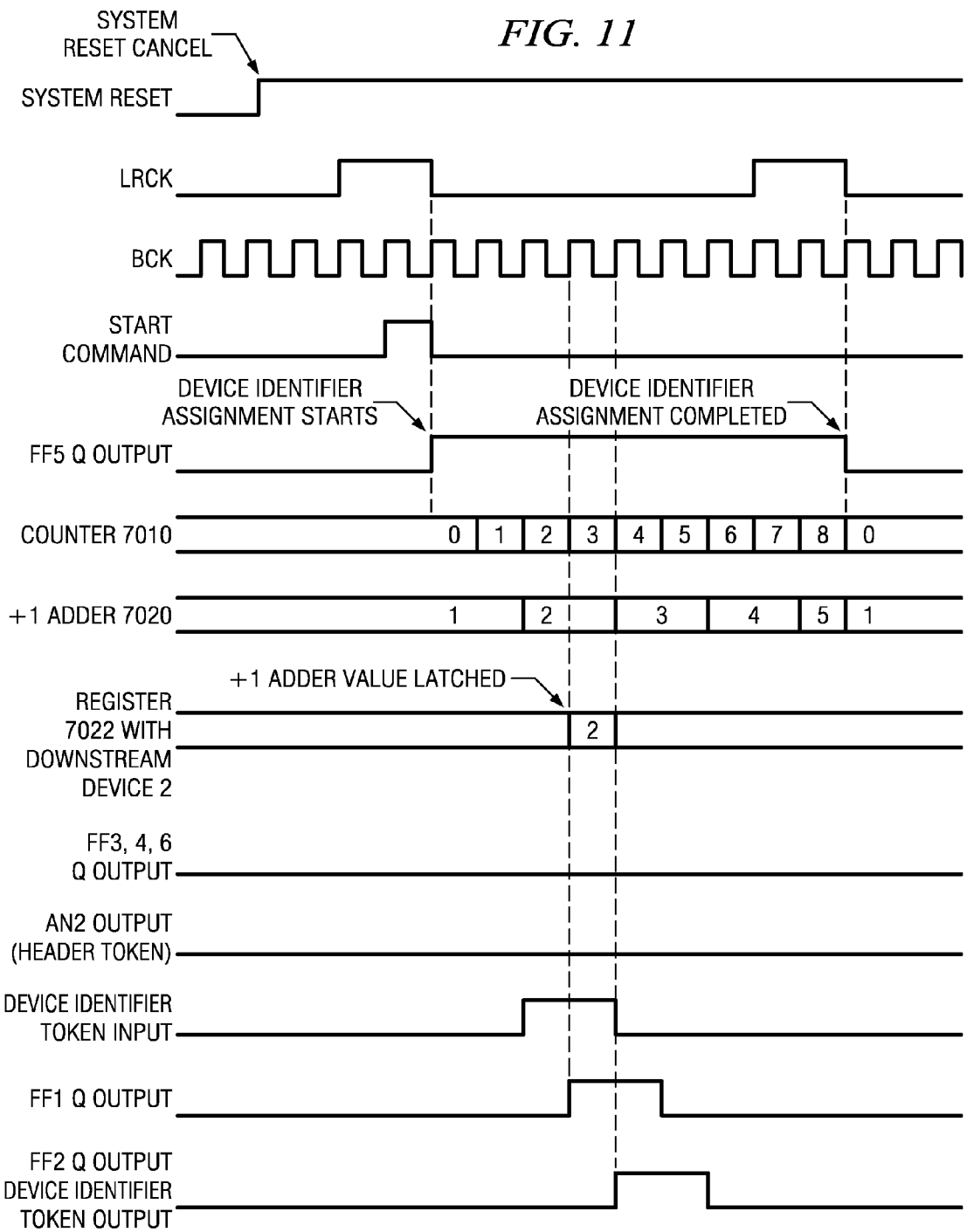
FIG. 11 is a timing chart illustrating the operation of device ID assignment circuit 70 of FIG. 9 in the second device which is next downstream from the header device.

Next, the operation of device ID assignment circuit 70 will be explained with reference to FIGS. 10 and 11. First the header device will be explained with reference to the timing chart in FIG. 10. First, after the system reset signal goes high, clock LRCK goes high and the VTDMCA frame is started. When the start of the device ID determination sequence is indicated by the fact that the start command received next is high, the Q output of F/F5 goes high, indicating the device ID determination sequence. In this way, counter 7010 starts counting clocks BCK as shown, and counting up the device identifiers by addition by adder 7020 is started. At the same time F/F6 outputs a header device signal indicating that said device is the header device, and then, in response to that, a header token that will be high for two clocks is generated through F/F3, 4, etc., as shown in the figure. This header token is passed to output by selector 7030, since the header device signal is high, and it is supplied to register 7022 and F/F1. Because of this, register 7022 latches the adder output "1" in this case, and stores it in response to the header token. This "1" indicates that the device identifier of said device="1." At the same time, F/F1 that receives the header token delays the header token for two clocks by operating together with F/F2 to generate a downstream side token, and this is generated for the Q output of F/F2. Device identifier=1 is given for the header device by the operation above.

Next the device one position downstream from the header device will be explained with reference to FIG. 11. In the case of a downstream device, the Q outputs of F/F6 and F/F3, 4 and 5 are all low, and as discussed above, the header device signal (F/F6 Q output), and header token (AN output) are low. At the same time, when the downstream token from the header device is received via DCI as the DID assignment token, selector 7030 passes this DID assignment token to output, since the header device signal is low, and it is supplied to 7022 and F/F1. Because of this, register 7022 at this time latches the adder output and stores device identifier=2. Simultaneously With this, F/F1 and F/F2 produce a DID assignment token for the device further downstream by delaying that token for two clocks.

With the operation described above, each device in the IN device group determines its own device ID, that is, each can be assigned a device ID. Note that when the Q output of F/F5 falls, this determination sequence is completed. The determination sequence must only be carried out once at system initialization, and thus the start command is only produced once at initialization. During operation after initialization, the device IDs that have been determined will remain stored in a register.

Figure 12:
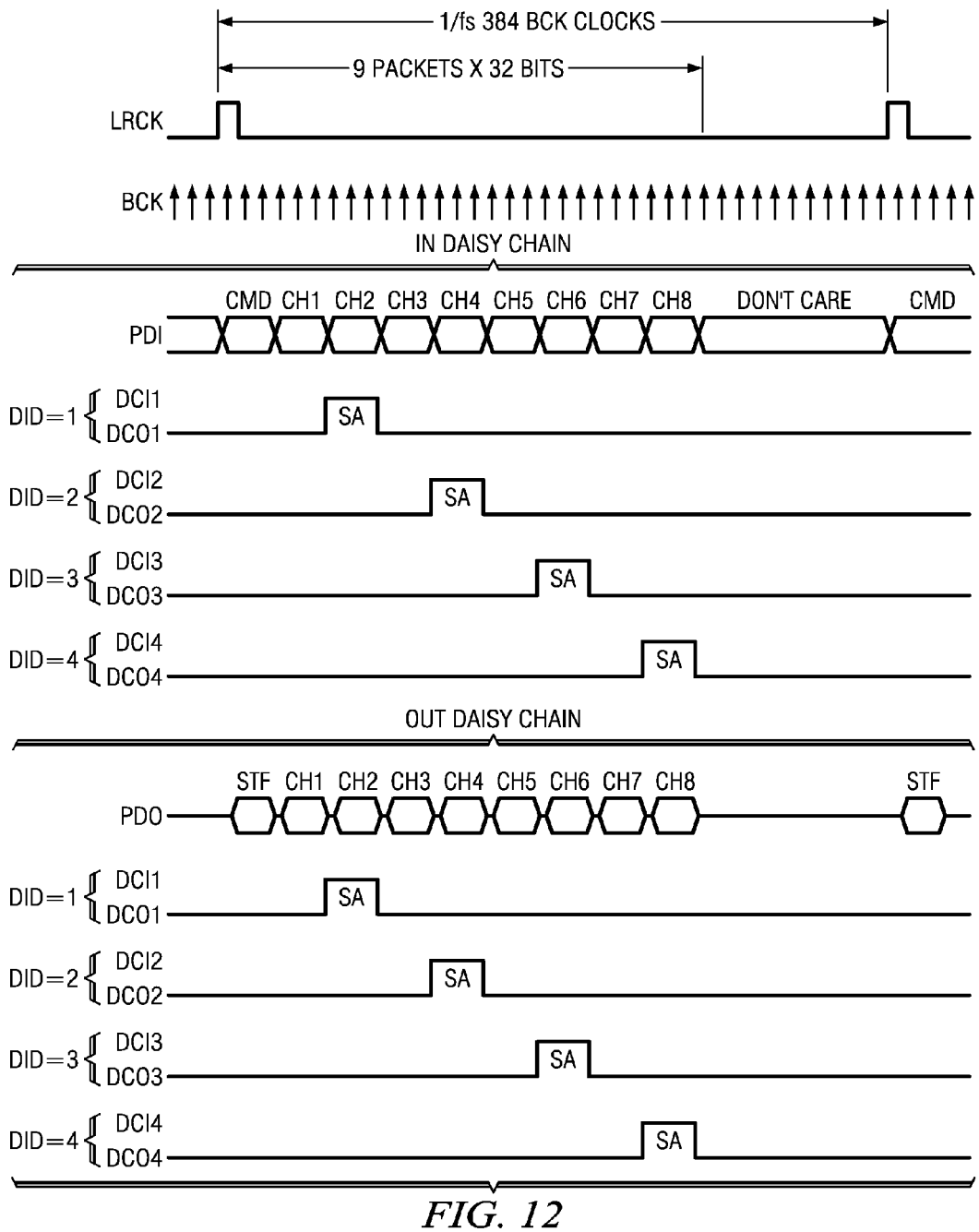
FIG. 12 is a timing chart illustrating the overall operation of the time slot allocation circuit shown in FIG. 3.

Next the overall operation of time slot allocation circuit 72 shown in FIG. 3 will be explained with reference to FIG. 12. This circuit is used to assign time slots in communication frames for each of the slave devices, such as IN devices or OUT devices, in variable time division multiplex (VTD-MCA) communication. Note that, because this time slot allocation is performed with the same method independently for both the IN devices and the OUT devices, the same as with device ID assignment circuit 70, it will be explained first for the IN device group shown in FIG. 12. As shown in the figure, one communication frame is the period from when clock LRCK goes high until the next time it goes high, the first time slot starts from when clock LRCK goes high, and many time slots continue afterward. With the example shown in FIG. 12, a PDI input command field is present in the first time slot, and one audio channel field ch1~ch8 is present in each of the second subsequent time slots. "Channel" here is separate from the channel number realized by a device, and the time slot number that can be used as a data transmission number in a communication frame is simply described as a channel number ch1~ch8. Also, in the figure examples, a period after ch8 is an unused period. Also, with the example in FIG. 12, when each IN device uses two channels, the most upstream device DID=1 uses ch1 and ch2, the next device DID=2 uses ch3 and ch4, then the next device DID=3 uses ch5 and ch6, and the last device DID=4 uses ch7 and ch8.

After the start of a communication frame, the header (most upstream) device, which is device number 1 with device ID DID=1, takes two channels worth starting from the first audio channel field after the command field in the PDI input received at the PDI port from DSP 1B, since two audio channels worth are enabled and the DCI1 port is always high. In this case, the DCO1 port is made high during the period of the time slot of the ch2 audio channel field, a time, slot allocation token (hereafter called time slot allocation SA) token is produced, and it is sent to the second IN device DID=2, which is one position downstream. The second IN device also takes two channel fields worth, so takes ch3 and ch4. Likewise, at this time the DCO2 port is made high during the period of the time slot of the ch4 audio channel field, an SA token is produced, and it is sent to the third IN device DID=3 which is one position downstream. After this, the last IN device DID=4 in the same way accepts an SA token and takes the audio channel fields for the channels for its own use (two) from the audio channel fields immediately following. It then produces an SA token for the period of the time slot for the last audio channel field, which is its own ch8, and transfers this SA token to the IN device that is one position downstream. Time division multiplex communication is realized in this way. Also, in this example, the last IN device DID=4 need not recognize that it is itself the last, and outputs an SA token downstream. Variable time division multiplexing can also be realized by setting the number of time slots that each device uses to be different from each other. Note that the timing for the IN device group above is the same as is also shown for the OUT device group.

Figure 13B:
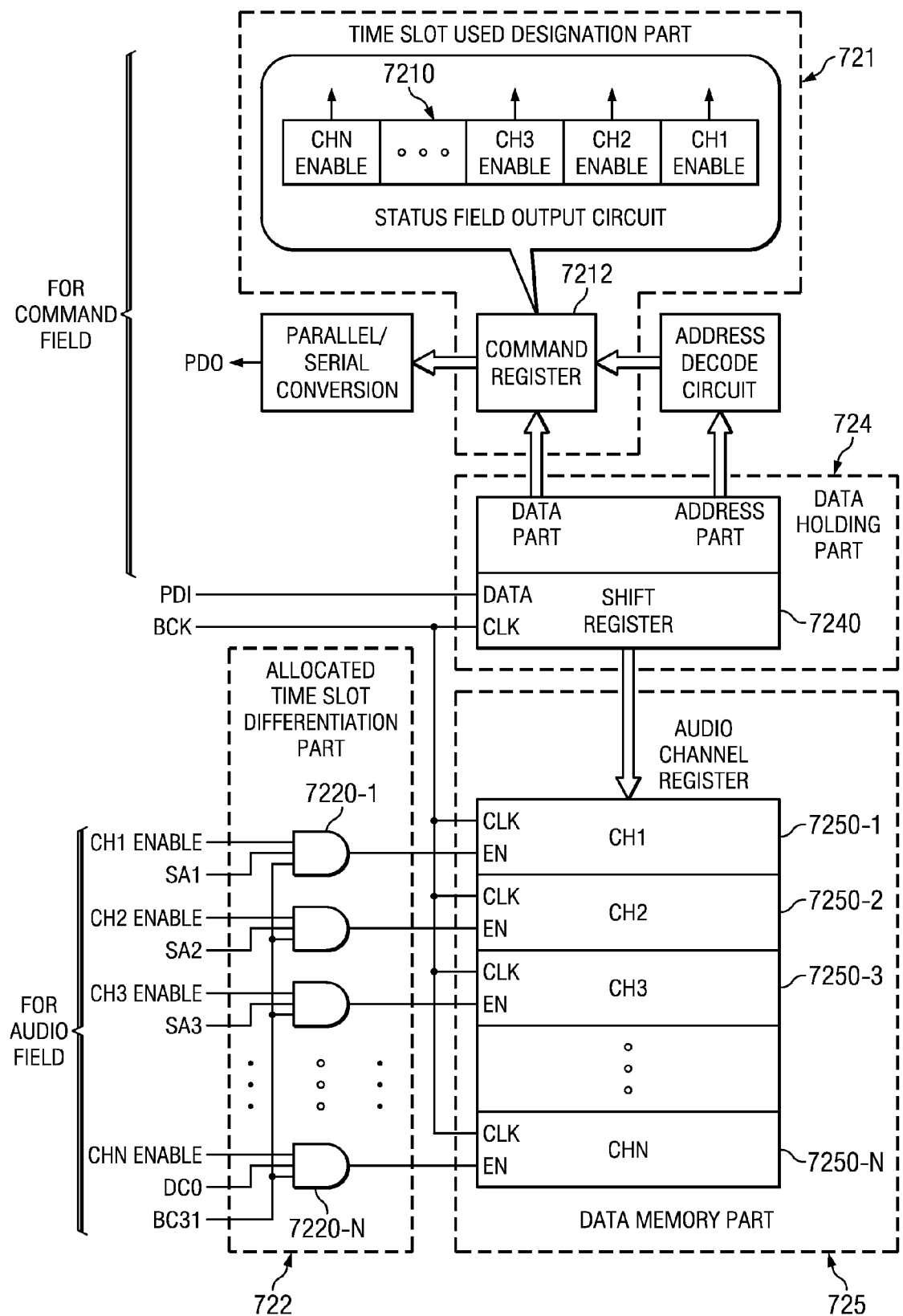

Next, the details of the circuitry of time slot allocation circuit 72 shown in FIG. 3 will be explained, with reference to FIGS. 13a-15. As shown in FIGS. 13a and 13b, time slot allocation circuit 72, broadly subdivided, is composed of time slot position designation part 720, time slot used designation part 721 (FIG. 13b), allocated time slot differentiation part 722 (FIG. 13b), data holding part 724, data memory part 725, SA (slot allocation) token production part 726, and source token production part 727. Time slot position designation part 720 is constituted with counter 7200 and AND gate 7202. Counter 7200 has a RST terminal that receives clock LRCK, a CK terminal that receives clock BCK, and 5 bits of counter output Q1-Q5. It is reset by the falling edge of clock LRCK, and when counting of the number of clocks BCK generated in the period of one time slot (32 clocks BCK), the 5 bit counter outputs Q1-Q5 all go high (they all go high at a count of "31," since the count starts from the second clock BCK). AND gate 7202, which has an input connected to each bit of the counter output, generates a high output only when the counter outputs are all "1." This high AND gate output will become a signal bc31 that designates the ending portion of each time slot.

Time slot used designation part 721 designates the number of time slots that the IN device uses, and is formed with N bit register 7210. N is the total number of channels furnished in the device. Register 7210 has channel enable bits from ch1 to chN, and when the relevant bit is "1," it indicates that that channel is enabled, that is, that the channel (or time slot) has been set to be used for the IN device. Thus a channel enable bit of "1" constitutes the time slot usage enable signal. Because there are N bits, they can be allocated to the IN devices up to N channels, and in this way variable time division multiplexing can be realized. Here, the ch1 enable signal does not mean the ch1 slot shown in FIG. 12, but rather the first of the slots that is set to be used by the relevant device. Register 7210 is included in the command register 7212, which is the internal register inside the relevant IN device. Each bit in register 7210 can be preset for the relevant IN device, and in this case, it is preferable when the system is designed that they be stored in the memory in DSP 1 B, which is the master device. However, if the details of allocation of time slots to the slave devices are not already known when the system is designed, or when they are variable, the master device can also write the details of time slot allocation for the slave devices, which are set in the master device after the system is designed, in register 7210 in command register 7212 of the slave device by communicating (using the command field). This can be accomplished via shift register 7240 and the address decoding circuit (FIG. 13b). Additionally, the setting details for the register that are set in the slave device can also be received by the master device by communicating. This is realized by reading slave device register 7210 via the field output circuit (parallel/serial conversion circuit) in the state shown in FIG. 13b and receiving. Allocated time slot differentiation part 722 is formed of N AND gates 7220-1-N, which correspond to channels 1-N. Each AND gate 7220 is connected so that it receives one [of them] corresponding to the chi-chN enable signals, which are the channel enable signals, at one input, receives the corresponding channel SA (time slot allocation) token input SA1-SAN or DCO in the same way at the other input, and receives slot start position designation signal be31 at the remaining third input. Each of the SA tokens SA1-SAN is allocated so that the time slots corresponding to each audio channel field 1-N can be used by the relevant device. Thus, for the output of each AND gate 7220, relating to a specific time slot, usage of this time slot (or channel) is enabled, and an SA token is received. Furthermore, a high output is generated only when a time slot position designation signal is received. This high output will be the allocated slot usage designation signal that indicates when it is high that the time slot is the slot that has been allocated to the relevant device (that is, the allocated slot), and that there is a slot that the relevant device will use (that is, a used slot). Note that when the channel enable signal is low, the allocated slot usage designation signal will be low, since this is a time slot that the relevant device will not use.

Data holdings part 724, as shown in the figure, includes shift register 7240. This shift register has a DATA terminal that receives PDI input from the PDI port, that is, packet data, a CK terminal that receives clock BCK, and an output terminal that generates the data held in the shift register. Shift register 7240 is operated to hold arriving PDI input only for the duration of one packet (or one time slot).

Data memory part 725 is constituted with N audio channel registers 7250-1~N, the same as the number N of channels. Each of these registers has an EN terminal that receives an allocated slot usage designation signal from the corresponding AND gate 7222, a CK terminal that receives clock BCK, and an input (shown schematically in the figure) connected to the output of shift register 7240. Each register 7250 stores a packet by receiving and latching a packet from shift register 7240 in the relevant allocated slot (or allocated channel) in response to the allocated slot usage designation signal from AND gate 7222. In this way, the relevant IN device can accept data from the time slot that has been allocated, and further, that is used. Note that the data in register 7250 will be read for purposes of subsequent processing (with DAC, digital-analog conversion).

Next, source token production part 727 is the circuit portion that generates a source token, and it generates a header token or outputs an SA token from upstream. Thus source token production part 727 is equipped with multiplexer MUX 7270 and header token production circuit 7272. One input of MUX 7270 is connected to daisy chain input DCI, and the other input is connected to the output of header token production part 7272. It also has a control input that receives the header device signal from a circuit of the same type (or it can be shared) as header device differential circuit 705 in FIG. 9. Thus when the header device signal is true, that is, high, that is, when the relevant device is the header device, a header token from circuit 7272 is passed to output. When it is low, that is, when the relevant device is a device other than the header device, the SA token received at the DCI port from upstream is passed to output. Header token production circuit 7272 has a BCK terminal that receives clock BCK and an LRCK terminal that receives clock LRCK, and it also has an output that generates a header token.

Specifically, as shown in FIG. 14, header token production circuit 7272 is formed with 6 bit 72720, AND gate 72722, and OR gate 72724. Counter 72720 has a CLK terminal that is coupled to the output of AND gate 72722 and a RST terminal that is connected to receive clock LRCK, and it also has 6 bits of counter outputs Q1~Q6. One input of AND gate 72722 receives clock BCK, and the other input is connected to the Q6 terminal of the most upstream level. Thus, clock BCK is supplied to the counter CLK terminal while Q6 is low, and when, following that, Q6 becomes high, supply of the clock to the counter CLK terminal is stopped until reset. Thus the OR gate that receives counter outputs Q1~Q5 generates a high for the output while at least one of the bit outputs of the 5 bit counter portion is high, that is, while the counter is between 1 and 31 (that is, the first time slot in the command field from among the time slots) (refer to the token in FIG. 16). This high OR gate output includes a header token.

Finally, SA token production part 726 shown in FIG. 13a is equipped with N cascade-connected token propagation circuits 7260-1~N furnished to correspond to the N channels. Each token propagation circuit 7260 has a BCK terminal that receives clock BCK, a BC31 terminal that receives time slot start position designation signal bc31, an enable EN terminal that receives the channel enable signal for the channel to which the propagation circuit corresponds, and an input IN terminal and an output OUT terminal. The propagation circuit, at the first stage, is furnished with an input IN terminal that receives a token from source token production part 727, and at stages after that, is furnished with an input IN circuit that is connected to the OUT terminal of the previous stage. The output OUT terminal of each propagation circuit outputs that token received by the IN terminal after it is delayed by approximately one time slot (approximately 32 clocks BCK) when the channel enable signal is high, and passes the token unchanged without delaying it when the channel enable signal is low. The OUT terminal of the last stage 7260-N supplies the SA token SAN to the next downstream device at the DCO port. In this way, each device on the downstream side will be able to use the time slot in turn. The tokens generated at the OUT terminal of each of these propagation circuits is the token for the next stage or the device that is next downstream, and it is also used as time slot allocation token SA1-SAN in the relevant device. Note that when the ch1 and ch2 channel enable signals are high, it means that two channels, that is, two slots, will be used, and does not mean that the time slots indicated by referring to ch1 and ch2 in FIG. 12 will necessarily be used. Thus when the device upstream of the relevant device is using chi and ch2 in FIG. 12, chi and ch2 that the relevant device will use will be analogous to the slots that refer to ch3 and ch4 in FIG. 12.

Specifically, as shown in FIG. 15, each propagation circuit 7260 is formed of multiplexer MUX 72600 and D type F/F with enable control 72602. One input of MUX 72600 is connected to the IN terminal of the relevant propagation circuit, the other input is connected to the Q output of F/F 72602, and the control input is connected to the EN terminal. In this way, when the EN terminal is low, the token received at the IN terminal passed unchanged. When the EN terminal is high, the Q output of the F/F becomes the MUX output, that is, the token at the IN terminal is passed delayed by 1 time slot. The D terminal of F/F 72602 is connected to the IN terminal. The EN terminal receives signal bc31. The F/F has a CLK terminal that is connected to receive clock BCK and latches the input signal only when EN is high. Thus this F/F generates a high signal during the next slot when the signal bc31 is high if the signal input from the IN terminal is high. Note that the setting of channels to be used by the relevant device is stored in register 7210, as described above.

Next the overall operation of time slot allocation circuit 72 will be explained, with reference to the timing charts in FIGS. 16-21b.

Figure 16:
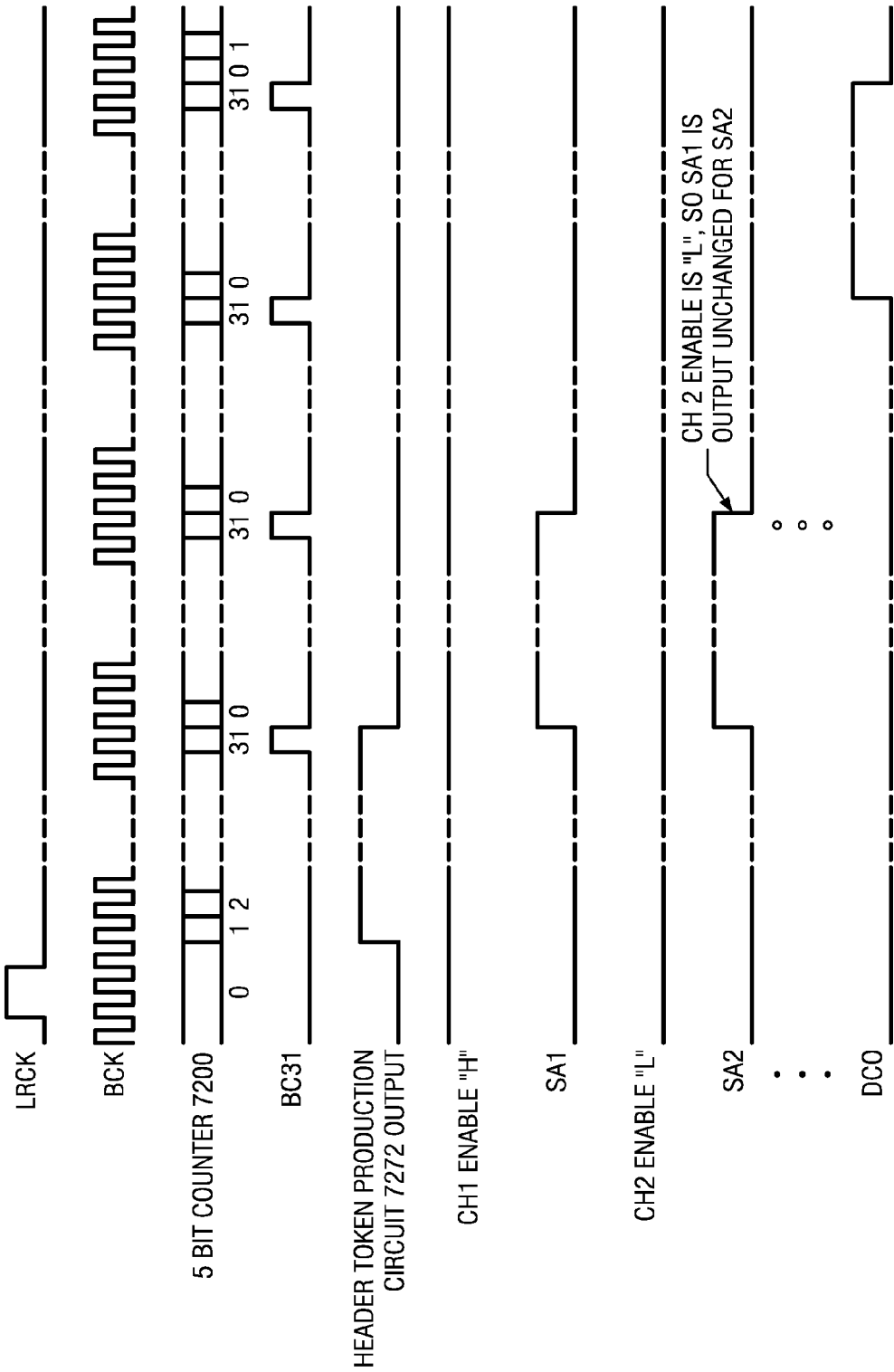
FIG. 16 is a timing chart that shows the various signals in the time slot allocation circuit under circumstances that include a case in which the header device uses channel ch1 and does not use ch2.

First, in FIGS. 16-20, the operation of one device, for example, the header device, will be explained. Here, in FIGS. 17-20, assume that there is a processing part for four channel in the device. In FIG. 16, a case is shown where the header device will use channel ch1 and will use still another channel that is not shown, but will not use ch2. Specifically 5 bit counter 7200 counts as shown under the effects of clocks LRCK and BCK as shown to generate a bc31 signal that will be high at the end of each slot, and the end of the slot is indicated in this way. Next, header token production circuit 7272 generates a header slot in the first slot, as shown. Because the header device will use ch1, ch1 enable is high, and thus token propagation circuit 7260-1 generates token SA1, which is delayed by 1 slot, as its output. The header device latches and stores the contents of shift register 7240 (channel (ch1) data) in register 7250-1 in response to the token. Next, the next token propagation circuit 7260-2, which receives token SA1, passes SA1 as SA2 unchanged without delaying it, since ch2 enable is low. At this time, the output of AND gate 7220-2 remains low, since the ch2 enable signal is low, and thus there is no latching of register 7250-2. Additionally, the header device, after using another channel, etc., finally generates a downstream token at the DCO port. In this way, the header device can receive only the channel data in the time slots used by the device.

Figure 17:
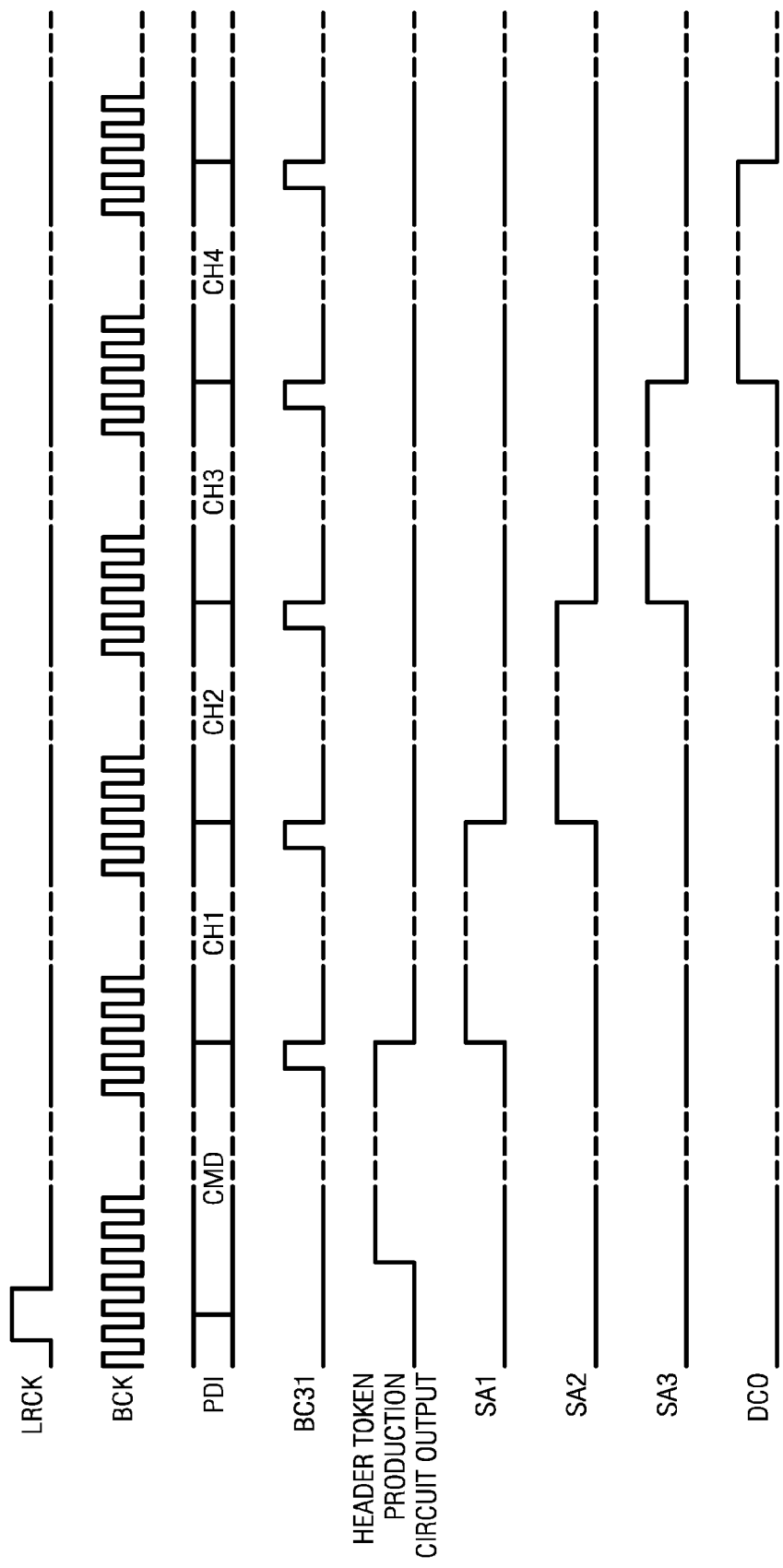
FIG. 17 is a timing chart for the various signals in the time slot allocation circuit in a case where the header device uses the four channels ch1~ch4.

Next, FIG. 17 shows a case in which the header devices use four channels ch1~ch4 (ch1~ch4 channel enable signals are high. In this case, the ch1~ch4 enable signals are high, so that SA1, SA2, SA3 and SA4=DCO will each be delayed by one slot from the header token, as shown. At this time, the outputs of AND gates 7220-1~4 are high, so there is latching of registers 7250-1~4. Note that the SA4 token is output to the DCO port as the token for the downstream device. In this way, it can be seen that many time slots can be used for one device, and variable time division multiplexing can be realized.

Figure 18:
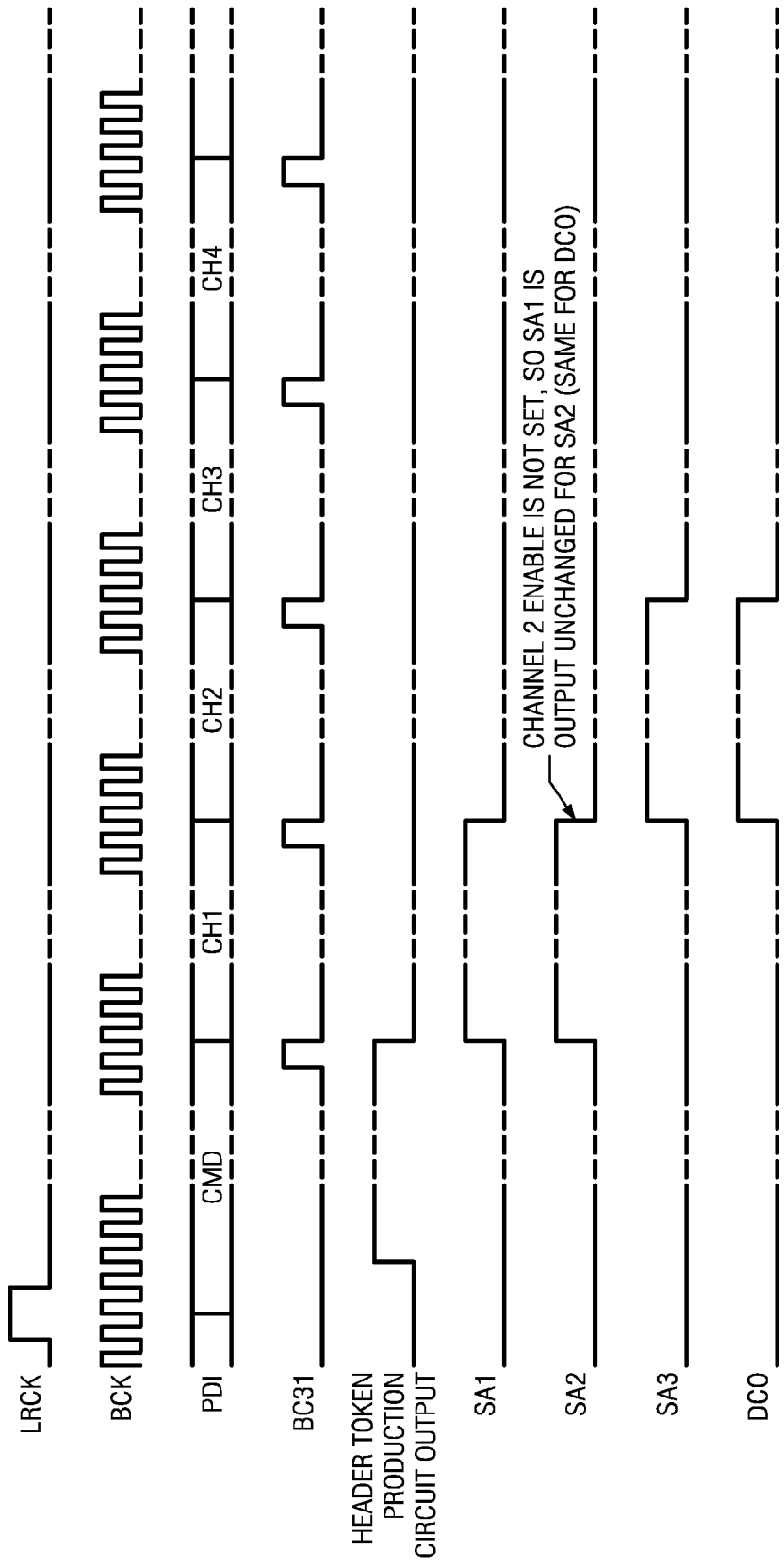
FIG. 18 is a timing chart for the signals in the time slot allocation circuit in a case where, with the enable signals for ch1 and ch3 being high, the header device uses two channels.

FIG. 18 is a timing chart for when the header device uses two channels, the enable signals for ch1 and ch3 being high. In this case, the ch2 enable signal is low, so the SA2 token is the same as the SA1 token. At this time, because the ch3 enable signal into AND gate 7220-3 is high, register 7250-3 will latch the ch2 audio channel field data in ch3 register 7250-3, rather than in ch2 register 7250-2. Thus, when two or more received channels are used in one device, the channels to be enabled are not necessarily consecutive. Under certain conditions, when ch2 and ch4 are not used in a device, or when chi and ch2, and ch3 and ch4, use the same data in a device, it is possible to increase the data transmission efficiency of the master device by using such a setting. In this way, any channel can be used within limits, and it will not be necessary to perform redundant data transmission. Note that in this example, the number of time slots used is 2.

Figure 19:
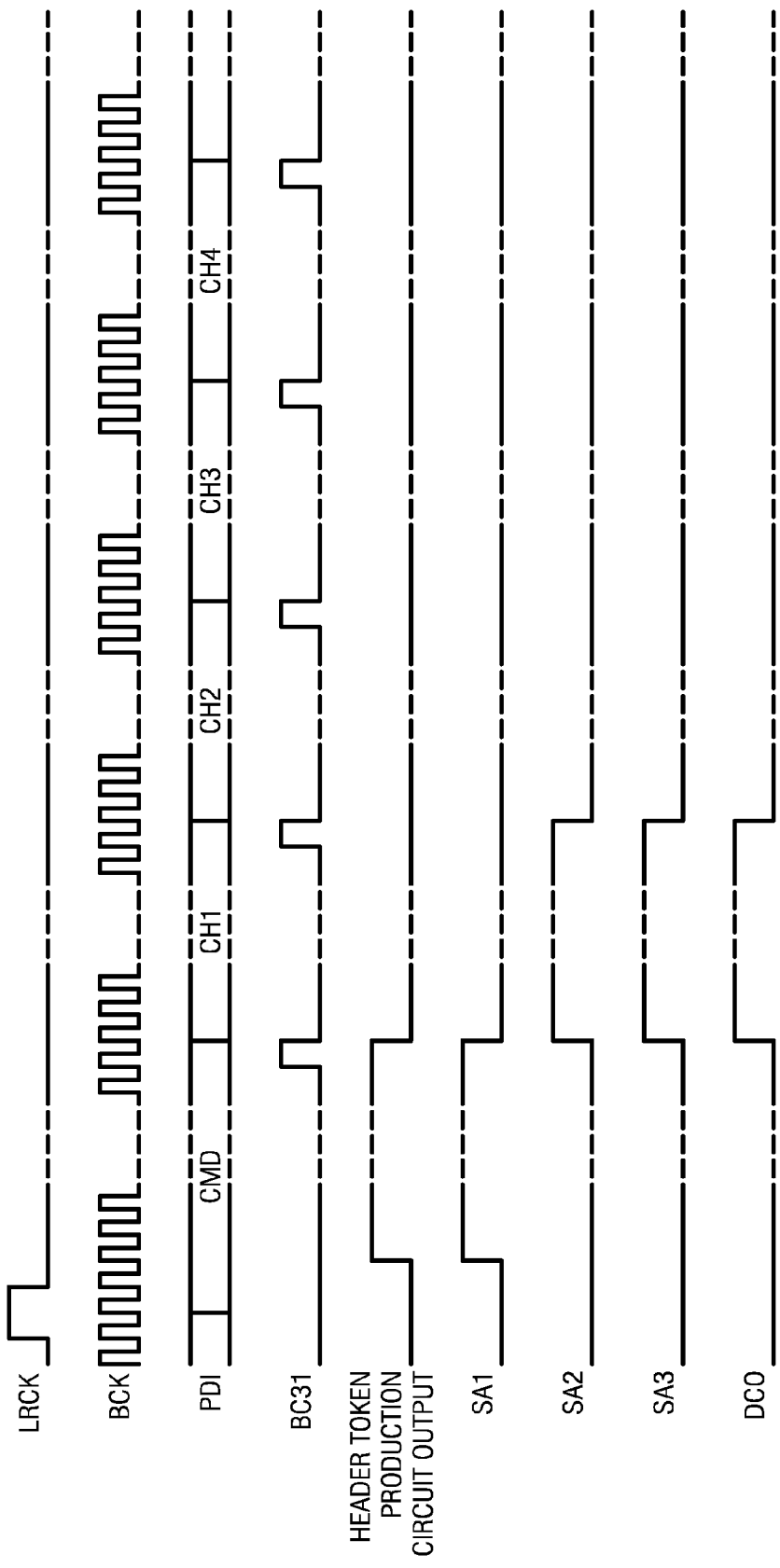
FIG. 19 is a timing chart for the signals in the time slot allocation circuit in a case where the ch1 enable signal is low and only the ch2 enable signal is high in the header device.

Next, FIG. 19 is a timing chart for when only the ch2 enable signal is high in the header device. In this case, the ch1 enable signal is low, so that SA1 is equal to the header token, and SA2 is delayed 1 slot from SA1. Then SA3, etc. after that are not delayed from SA2. In this case, only the output of AND gate 7220-2 will be high, so that the ch2 register 7250-2 will receive the ch1 audio channel field data. This is an example in which only ch2 is used out of the four channels furnished for the device.

FIG. 20 shows a timing chart for when all of the ch enable signals are low, that is when none of the time slots is used. In this case, the header token is transmitted unchanged, without being delayed, as SA1, SA2, SA3, etc., and is then transmitted unchanged to the downstream side device. This device usage mode can be employed when the relevant device is not used at all under certain conditions, or when a daisy chain connection is required but there is absolutely no input or output and the time slots do not have to be used. In this situation, a case wherein the number of time slots used=0 is set up. Each of the channels in the device can be set for use/non-use as described above, and transmission efficiency can be increased because it is not necessary to transmit data redundantly.

Figure 21A:
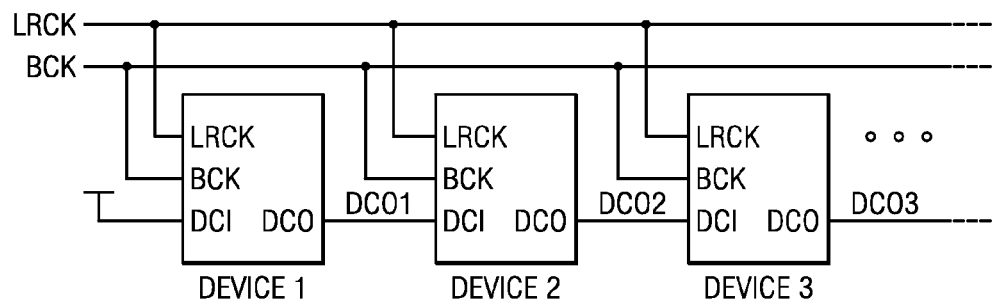
FIGS. 21a and 21b illustrate and arrangement and timing chart that shows the transfer of SA tokens among multiple devices.
Figure 21B:
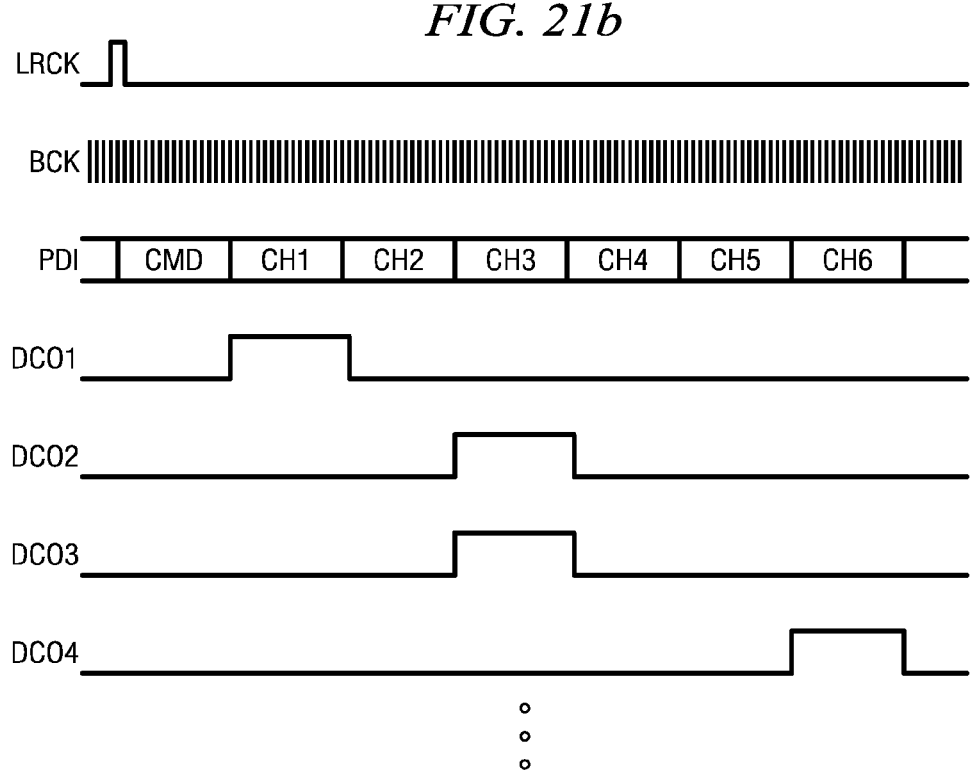

FIG. 21b is a timing chart that shows the transfer of SA tokens among multiple devices. The example illustrated shows a case wherein multiple devices are cascade-connected as shown in FIG. 21a. Furthermore, assume that device 1 uses one channel, device 2 uses two channels, device 3 uses absolutely no channels, and device 4 uses three channels. In this case, as shown in the timing chart in FIG. 21b, device 1 will generate a token that is delayed 1 slot from the header token, for output DCO1, by using the ch1 audio channel field. Next, device 2 uses two channels, so it generates a token that is delayed by an additional 2 slots, for DCO2. Device 3 uses no slots, so it outputs the output token from device 2 for DCO3 unchanged, without delaying it. Next, device 4 uses three channels, so that it generates a token wherein the token from device 3 is further delayed by 3 slots, for DCO4. In this way, the daisy chain between the devices can be used to propagate a time slot allocation token in sequence. Additionally, along. In this way, the number of time slots used can be set arbitrarily with each device, so that in this example, device 2 will have two times the propagation bandwidth of device 1, and device 4 will have three times the propagation bandwidth of device 1. Also, the propagation band of device 3 is zero. Thus, with this invention variable time division multiplexing can be realized using a daisy chain.

Data transmission from DSP 1B to IN devices was explained above, but data transmission from the OUT devices to DSP 1B can be realized in the same way. The difference is that the data to be output are arranged in register 7250 and those data are moved to shift register 7240 at the start of the allocated slot and output from the PDO port. Otherwise, transfer of time slot allocation SA tokens and use of the channel enable signals is the same. As can also be seen from the explanation, the IN device group and OUT device group a equipped with separate daisy chains, so that assignment of device identifiers and the transmission of time slot allocation tokens are possible independently of each other, so that they can operate simultaneously.

A preferred embodiment of this invention was explained above, but this embodiment can be changed in various ways. First, the number of daisy chains can be any number of two or more, corresponding to the number of device groups. In this case, a daisy chain connection line identifier or number must be stored as the device group identifier for the devices in each daisy chain group. Second, the master device, besides being a DSP, could also be a programmable device such as a microprocessor, and its serial port can also be used for data transmission to the slave devices. Third, rather than the device identifiers for the slave devices being stored in advance in the master device memory, they can also be transmitted to the master device from the slave device. This can be achieved by reading the internal registers of the slave devices.

Figure 22:
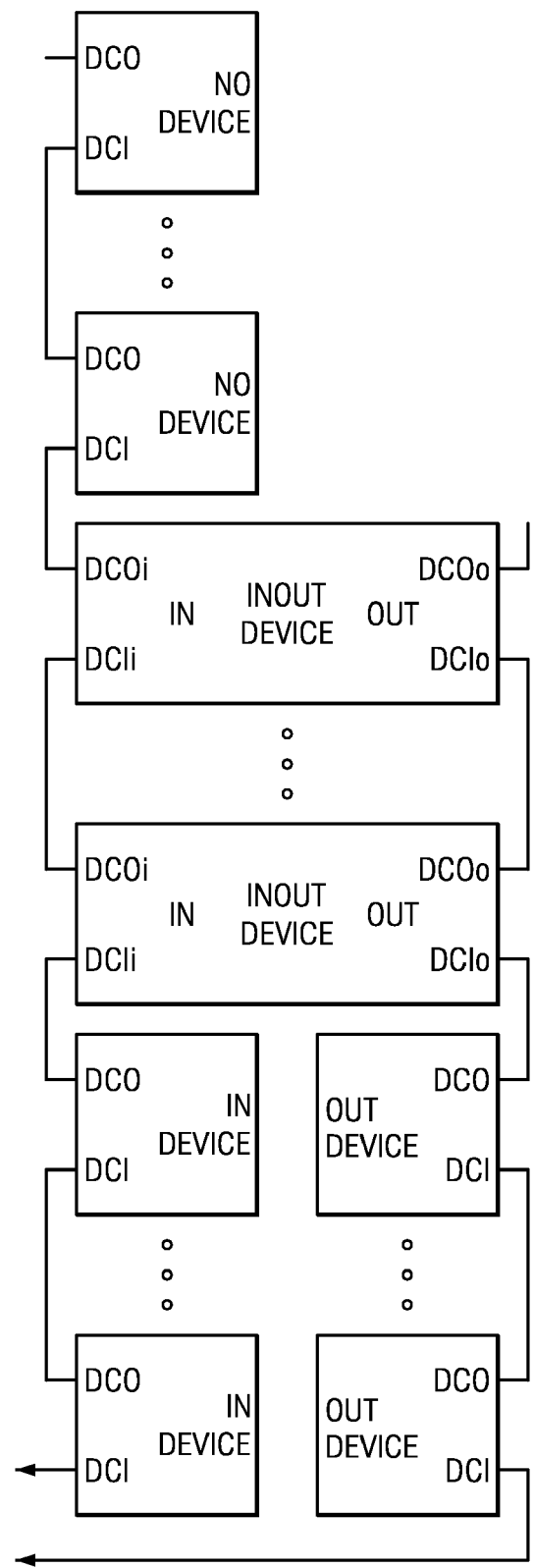
FIG. 22 is a block diagram that shows an example of a system in which the same devices are connected to two daisy chains.

Fourth, as shown in FIG. 22, it is also possible to connect the same devices to two or more daisy chains. For example, there is the situation in which the slave device is an IN/OUT device such as a CODEC, as shown. In this case it is sufficient to furnish only one device ID assignment circuit 70, but two time slot allocation circuits 72 must be furnished. This is because the device ID is used for command and field transmission and reception, so that it can be differentiated at the master side and one is sufficient, but the audio channel fields are independent from each other for receiving (IN side) and transmitting (OUT side), so that two daisy chains are required. Fifth, a different variable transmission band can be realized for each slave device by changing the number of slots allocated to each slave device in the way.

Sixth, the bus in the embodiment was a serial bus, but a parallel bus can also be used in the same way. Seventh, an example wherein the bus time slot allocation order was a "prescribed order" was shown with the embodiment, but this invention can also be applied to other resource allocation orders. Eighth, the system is an example of an audio system, but this invention can also be applied to other systems (for example, a LAN, ATM, monitoring system, automatic measuring device, etc.). Ninth, devices such as DACs or ADCs were shown as the slave devices, but they can also be other integrated circuit chips, or other types or scales of circuits, units, devices, or equipment (for example, terminals, computers, cameras, microphones, temperature sensors humidity sensors, pressure sensors, actuators, etc.).

Additionally, with the embodiment, the allocation of the transmission path at different allocation rates was realized by dividing the time that the transmission path is used into many time slots at a fixed time and varying the number of time slots used, but this allocation rate can also be some other rate, such as the rate relative to the length of the allocated time or the rate relative to the frequency of allocation.

With this invention explained above, a single transmission path can be used with variable time division multiplexing. In this way, the use of the transmission path by several channels can be made efficient or optimal. The result, if the amount of allocation of time slots is made variable, is that even when there are present together devices that do not use the shared resource, that is, the transmission path, devices that use it, and devices that use it frequently (IN devices DAC, OUT devices ADC, IN/OUT devices CODEC), the amount of communication by those devices can be optimized (minimal redundancy). The allocation rate can also be adjusted according to the circumstances, such as increasing the allocation rate of the transmission path only when higher speed transmission is required.

Allocation of the transmission path or allocation of the time slots can also be realized by the daisy chains connecting the channel devices and by the time slot allocation circuits associated with them. In this way, it will not be necessary to give an address or identifier to allocate time slots to the channel devices. The result is that it will not be necessary to print a device identifier or address an the ROM beforehand during chip production for devices such as integrated circuit chips, or to prepare and provide complicated protocols, or to provide a specific device identifier for specific device types as in the past, and it will also not be necessary to provide device identifiers for the devices externally. In this way, system design of the circuits, etc., will not be restricted by characteristic device identifiers of the chips, so that the same types of chips from different manufacturers can be used interchangeably.

And in addition, with this invention it will be unnecessary for the destination device address or device identifier to be included in the data transmitted over the transmission path, so that the transmission rate of the data can be increased from the start.

The invention claimed is:

1. A system comprising:
    a master device having a clock terminal, a frame terminal, a data-in terminal, and a data-out terminal, wherein a frame synchronous signal is received through the frame terminal, and wherein master device supplies a device identifier setting command through its data-out terminal in synchronization with a frame synchronous signal; and
    a plurality of slave devices that are coupled to one another in a cascading sequence through daisy-chain input and output terminals within each of the slave devices, wherein each slave device includes:
        a clock input terminal coupled to the clock signal of the master device;
        a frame terminal coupled to the frame signal terminal of the master device;
        a data-in terminal coupled to the data-out terminal of the master device;
        a data-out terminal coupled to the data-in terminal of the master device;
        a device ID assignment circuit coupled to each of its daisy-chain input and output terminals, wherein the device ID assignment circuit includes:
            a sequence initiation control circuit that outputs a sequence signal that indicates a device identifier decision sequence in response to the device identifier setting command and the frame synchronous signal;
            a counter that counts the clock signal in response to the sequence signal;
            a token generation circuit that generates a device identifier setting token for a subsequent slave device in the sequence in response to the clock signal and one of a predetermined logic signal from the master device and the device identifier setting token from a previous slave device; and
        a time slot allocation circuit coupled to each of its daisy-chain input and output terminals.

2. The system of claim 1, wherein the sequence initiation control circuit further comprises:
    a D flip-flop having an input terminal coupled to the data-in terminal of its slave device and a clock terminal; and
    an inverter that is coupled between the frame terminal of its slave device and the clock terminal of the D flip-flop.

3. The system of claim 1, wherein the token generation circuit flirt her comprises:

a token differentiation circuit that is coupled to the daisy-chain input terminal of its slave device;
a header differentiation circuit that is coupled to the data-in terminal of its slave device and the daisy-chain input terminal of its slave device;
a header token production circuit that is coupled to the header differentiation circuit, the sequence initiation control circuit, the clock terminal of its slave device, and the token differentiation circuit; and
a downstream token production circuit that is coupled to the clock terminal of its slave device, the sequence initiation control circuit, and the token differentiation circuit.

4. The system of claim 3, wherein the token differentiation circuit further comprises a multiplexer having:
a first input terminal coupled to the daisy-chain input terminal of its slave device;
a second input terminal coupled to the header token production circuit; and
a selection terminal coupled to the header differentiation circuit.

5. The system of claim 3, wherein the header differentiation circuit further comprises:
an AND gate that is coupled to the data-in terminal of its slave device and a clock terminal and the daisy-chain input terminal of its slave device; and
a D flip-flop having an input terminal coupled to the AND gate, a clock terminal coupled to the sequence initiation control circuit, and an output terminal coupled to the header token production circuit and the token differentiation circuit.

6. The system of claim 3, wherein the header token production circuit further comprises:
a first D flip-flop having a clock terminal coupled to the clock terminal of its slave device, an input terminal coupled to the header differentiation circuit, and an output terminal;
a second D flip-flop having an input coupled to the output of the first D flip-flop, an clock input coupled to the clock terminal of its slave device, and an output terminal;
an inverter coupled to the output of the second D flip-flop; and
an AND gate coupled to the inverter, the clock terminal of its slave device, and the token differentiation circuit.

7. A system comprising:
a master device having a clock terminal, a frame terminal, a data-in terminal, and a data-out terminal; and
a plurality of slave devices that are coupled to one another in a cascading sequence through daisy-chain input and output terminals within each of the slave devices, wherein each slave device includes:
a clock input terminal coupled to the clock signal of the master device;
a frame terminal coupled to the frame signal terminal of the master device;
a data-in terminal coupled to the data-out terminal of the master device;
a data-out terminal coupled to the data-in terminal of the master device;
a device ID assignment circuit coupled to each of its daisy-chain input and output terminals; and
a time slot allocation circuit coupled to each of its daisy-chain input and output terminals, wherein the time slot allocation circuit includes:
a time slot position designation circuit coupled to the clock terminal of its slave device and the frame terminal of its slave device;
a source token circuit coupled to the clock terminal of its slave device, the daisy-chain input terminal of its slave device, and the frame terminal of its slave device;
a token production circuit coupled to the time slot position designation circuit, the source token circuit, and the daisy-chain output terminal of its slave device;
a time slot differentiation circuit coupled to the token production circuit; and
memory coupled to the time slot differentiation circuit, the data-in terminal of its slave device, and the clock terminal of its slave device.

8. The system of claim 7, wherein the time slot position designation circuit further comprises:
a bit counter coupled to the clock terminal of its slave device and the frame terminal of its slave device; and
an AND gate coupled to the bit counter.

9. The system of claim 7, wherein the source token circuit further comprises:
a header token production circuit the clock terminal of its slave device and the frame terminal of its slave device; and
a multiplexer coupled to the header token production circuit and the daisy-chain input terminal of its slave device.

10. The system of claim 7, wherein the token production circuit further comprises a plurality of token propagation circuits coupled in series with one another.

11. The system of claim 10, wherein the time slot differentiation circuit further comprises a plurality of AND gates, wherein each AND gate is coupled to at least one of the token propagation circuits and the time slot position designation circuit.

* * * * *